(12) United States Patent
Lu

(10) Patent No.: US 10,024,904 B2
(45) Date of Patent: Jul. 17, 2018

(54) METHOD OF CHARACTERIZING AND MODELING LEAKAGE STATISTICS AND THRESHOLD VOLTAGE FOR ENSEMBLE DEVICES

(71) Applicant: INTERNATIONAL BUSINESS MACHINES CORPORATION, Armonk, NY (US)

(72) Inventor: Ning Lu, Essex Junction, VT (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 0 days.

(21) Appl. No.: 15/666,790

(22) Filed: Aug. 2, 2017

(65) Prior Publication Data

US 2017/0328948 A1 Nov. 16, 2017

Related U.S. Application Data

(63) Continuation of application No. 14/226,865, filed on Mar. 27, 2014, now Pat. No. 9,791,497.

(51) Int. Cl.
*G01R 31/26* (2014.01)
*G06F 17/50* (2006.01)
*G01R 31/02* (2006.01)

(52) U.S. Cl.
CPC ..... *G01R 31/2621* (2013.01); *G06F 17/5036* (2013.01); *G06F 17/5063* (2013.01); *G01R 31/025* (2013.01); *G06F 2217/10* (2013.01)

(58) Field of Classification Search
CPC .................................................. G01R 31/2621

(Continued)

(56) References Cited

U.S. PATENT DOCUMENTS 6,810,509 B2 10/2004 Murakami
7,353,473 B2 4/2008 Pino et al.
(Continued)

OTHER PUBLICATIONS

Disclosed Anonymously, "Method and System for Enhancing Precision of Compact FET Models", IPCOM000226331D, Mar. 27, 2013, pp. 1-3.

(Continued)

*Primary Examiner* — Ricky Ngon
(74) *Attorney, Agent, or Firm* — Steven Meyers; Andrew M. Calderon; Roberts Mlotkowski Safran Cole & Calderon, P.C.

(57) ABSTRACT

An approach for determining leakage current and threshold voltage for ensemble semiconductor devices, implemented in a computer infrastructure having computer executable code tangibly embodied on a computer readable storage medium having program instructions, are operable to: receive a number m of individual devices within an ensemble device; identify a sub-threshold slope; determine an uplift factor; separate random variation in logarithm of a leakage current into a correlated random component and an uncorrelated random component; determine a first standard deviation of correlated random component for the ensemble device; determine a second standard deviation of the uncorrelated random component for the ensemble device; generate a statistical model for electrical features of the ensemble device, based on the number m of individual devices, the sub-threshold slope, the uplift factor, the first and second standard deviation, and statistical random variables; and determine the electrical features of the ensemble device based on the statistical model.

13 Claims, 14 Drawing Sheets

(58) Field of Classification Search
USPC .......................................................... 702/65
See application file for complete search history.

(56) References Cited

U.S. PATENT DOCUMENTS

| | | | |
|---|---|---|---|
| 7,996,810 B2 | 8/2011 | Bernstein et al. | |
| 2009/0164155 A1 | 6/2009 | Agarwal et al. | |
| 2011/0082680 A1* | 4/2011 | Chang ................ | G01R 31/2848 703/14 |
| 2012/0179412 A1 | 7/2012 | Bhavnagarwala et al. | |

OTHER PUBLICATIONS

Magnone, P., et al., "FinFet Mismatch In Subthreshold Region: Theory And Experiments", IEEE, vol. 57, No. 11, Nov. 2010, pp. 2848-2856.
Drego, N., et al, "Lack of Spatial Correlation In MOSFET Threshold Voltage Variation And Implications For Voltage Scaling", IEEE, vol. 22, May 2009, pp. 245-255.
Hook, T., et al., "Estimation of Iddq for early chip and technology design decisions", IEEE, 2003, Abstract.
Lichtensteiger, S., et al., "Modeling Leakage in ASIC Libraries", IEEE, 2005, Abstract.

* cited by examiner

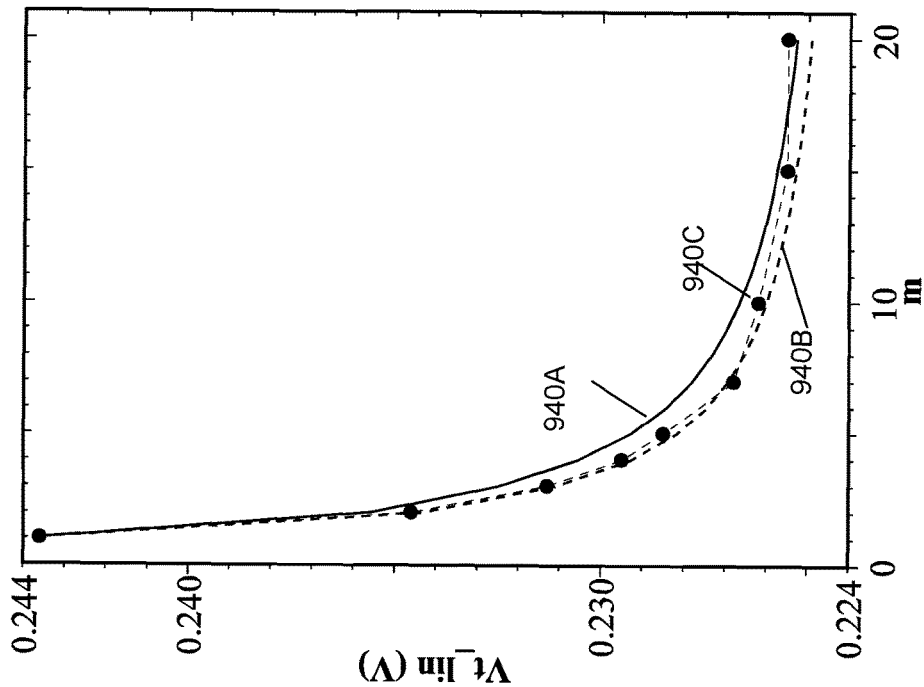
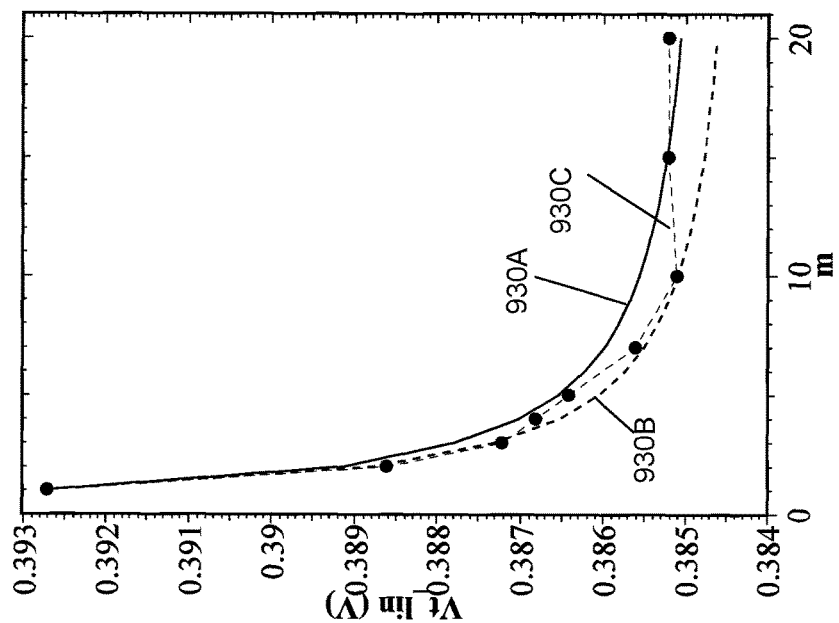
FIG. 9D
FIG. 9C

METHOD OF CHARACTERIZING AND MODELING LEAKAGE STATISTICS AND THRESHOLD VOLTAGE FOR ENSEMBLE DEVICES

FIELD OF THE INVENTION

The present invention generally relates to determining chip power optimization, and more particularly, to a method and system for determining accurate levels of leakage current and threshold voltage for ensemble semiconductor devices.

BACKGROUND

Within the field of circuits and semiconductors, various electrical features of different circuit devices, such as field effect transistors (FETs), metal-oxide-semiconductor FETs (MOSFETs), etc., can be used to determine chip power optimization of the circuit device. For example, various types of FETs include structure that comprises a gate, source, and drain. When the gate voltage of a FET device (i.e., the voltage difference between the gate and the source of the FET device) is larger than the threshold voltage of the FET, electric current (also called drain current) can travel from the source to the drain. However, when the gate voltage applied to the FET is less than the threshold voltage, there is not a significant amount of current traveling from the source to the drain.

There are instances that when the gate voltage applied to the FET is less than the threshold voltage, or even when there is no voltage applied to the gate, an amount of current still passes between the source and drain. This amount of current is known as the leakage current and can affect the total chip power dissipation for a device. The leakage current, also known as Iddq current, can be caused by various factors, such as diffusion, random doping fluctuation (RDF), line edge roughness (LER), etc. When a FET device contains multiple individual FET devices that are connected in parallel (often called an ensemble FET; examples include multi-finger planar FET, a finFET device containing multiple fins), other issues can exist relating to determining the leakage current. For example, the variation of the leakage current in one FET device can be uncorrelated to the leakage current in another individual FET where the two FETs are part of an ensemble device.

SUMMARY

In a first aspect of the invention, a method implemented in a computer infrastructure having computer executable code tangibly embodied on a computer readable storage medium having program instructions. The program instructions are operable to receive a number m of individual devices within an ensemble device. Program instructions are operable to identify a sub-threshold slope. Program instructions are operable to determine an uplift factor. Program instructions are operable to separate random variation in a logarithm of a leakage current into a correlated random component and an uncorrelated random component. Program instructions are operable to determine a first standard deviation of the correlated random component for the ensemble device. Program instructions are operable to determine a second standard deviation of the uncorrelated random component for the ensemble device. Program instructions are operable to generate a statistical model for electrical features of the ensemble device, based on the number m of individual devices, the sub-threshold slope, the uplift factor, the first standard deviation, the second standard deviation, and statistical random variables. Program instructions are operable to determine the electrical features of the ensemble device based on the statistical model.

In another aspect of the invention, there is a computer program product for determining leakage current. The computer program product includes a computer usable storage medium having program code embodied in the storage medium. The program code is readable/executable by a computing device to receive a number m of individual devices within an ensemble device. The computer program product includes identifying a sub-threshold slope. The computer program product includes determining an uplift factor. The uplift factor varies with number m of individual devices. The computer program product includes determining a first standard deviation for the ensemble device. The first standard deviation is associated with an uncorrelated component of random variation. The computer program product includes determining a second standard deviation. The second standard deviation is associated with a correlated random variation. The computer program product includes generating a statistical model for leakage current and threshold voltage of the ensemble device, based on the number m of individual devices, the sub-threshold slope, the uplift factor, the first standard deviation, the second standard deviation, and statistical random variables. The computer program product includes determining the leakage current and the threshold voltage of the ensemble device based on the statistical model.

In a further aspect of the invention, there is a system that includes a CPU, a computer readable memory and a computer readable storage medium. Additionally, the system includes one or more program instructions. Program instructions are operable to receive a number m of individual devices within an ensemble device. Program instructions are operable to identify a sub-threshold slope. Program instructions are operable to determine a first standard deviation and a second standard deviation for the ensemble device. The first standard deviation is associated with an uncorrelated component of random variations and the second standard deviation is associated with a correlated component of random variations. Program instructions are operable to determine an uplift factor. The uplift factor varies with the number m of individual devices, the standard deviation, and the sub-threshold slope. Program instructions are operable to generate a statistical model for leakage current and threshold voltage of the ensemble device, based on the number m of individual devices, the sub-threshold slope, the uplift factor, the first standard deviation, the second standard deviation, and statistical random variables. Program instructions are operable to determine the leakage current and the threshold voltage of the ensemble device based on the statistical model. The program instructions are stored on the computer readable storage medium for execution by the CPU via the computer readable memory.

BRIEF DESCRIPTION OF THE SEVERAL VIEWS OF THE DRAWINGS

The present invention is described in the detailed description which follows, in reference to the noted plurality of drawings by way of non-limiting examples of exemplary embodiments of the present invention.

FIGS. 9A-9D show example graphical representations of various semiconductor electrical features in accordance with aspects of the invention;

DETAILED DESCRIPTION

Figure 1:
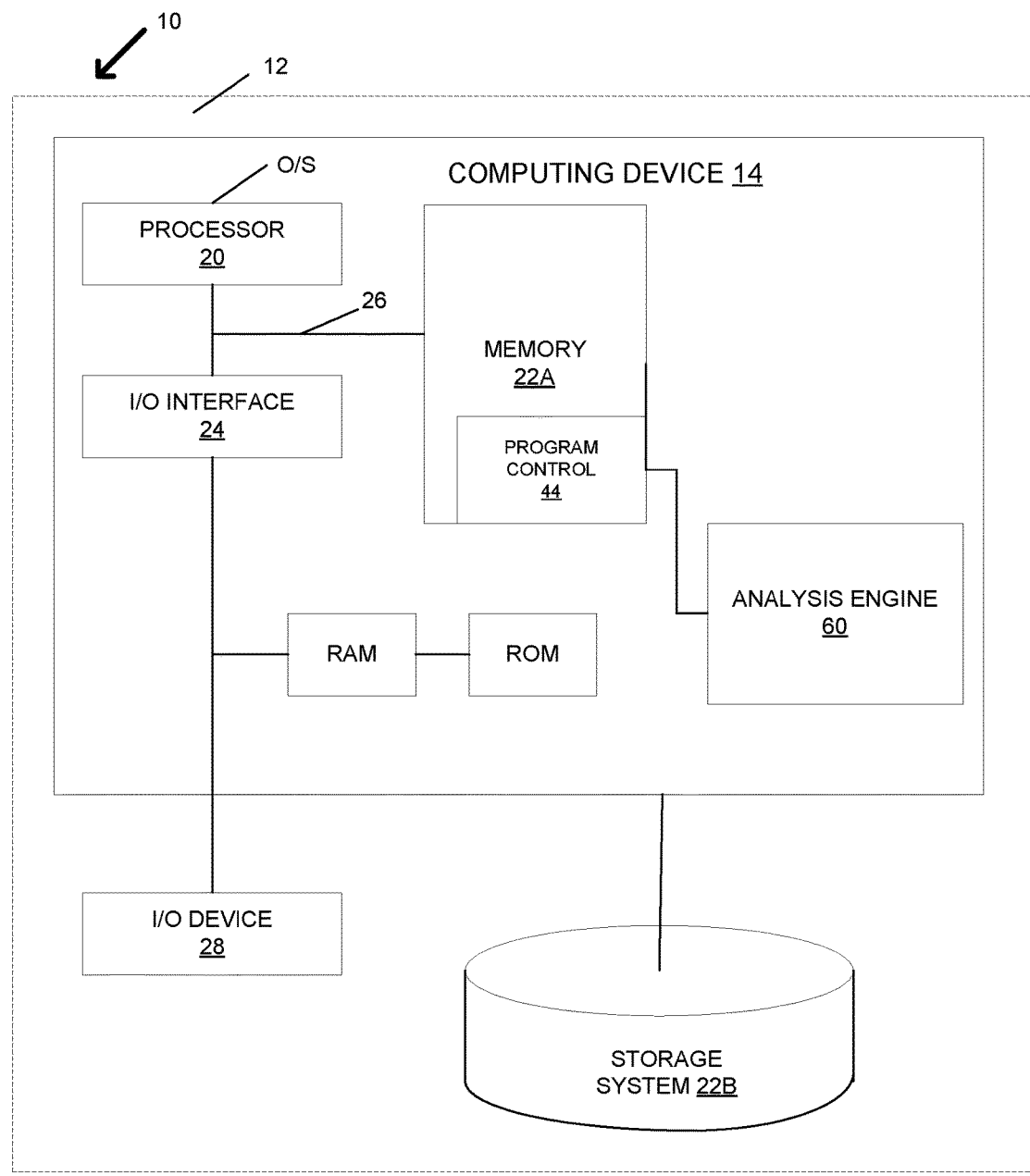
FIG. 1 is an illustrative environment for implementing the steps in accordance with aspects of the invention.
Figure 2:
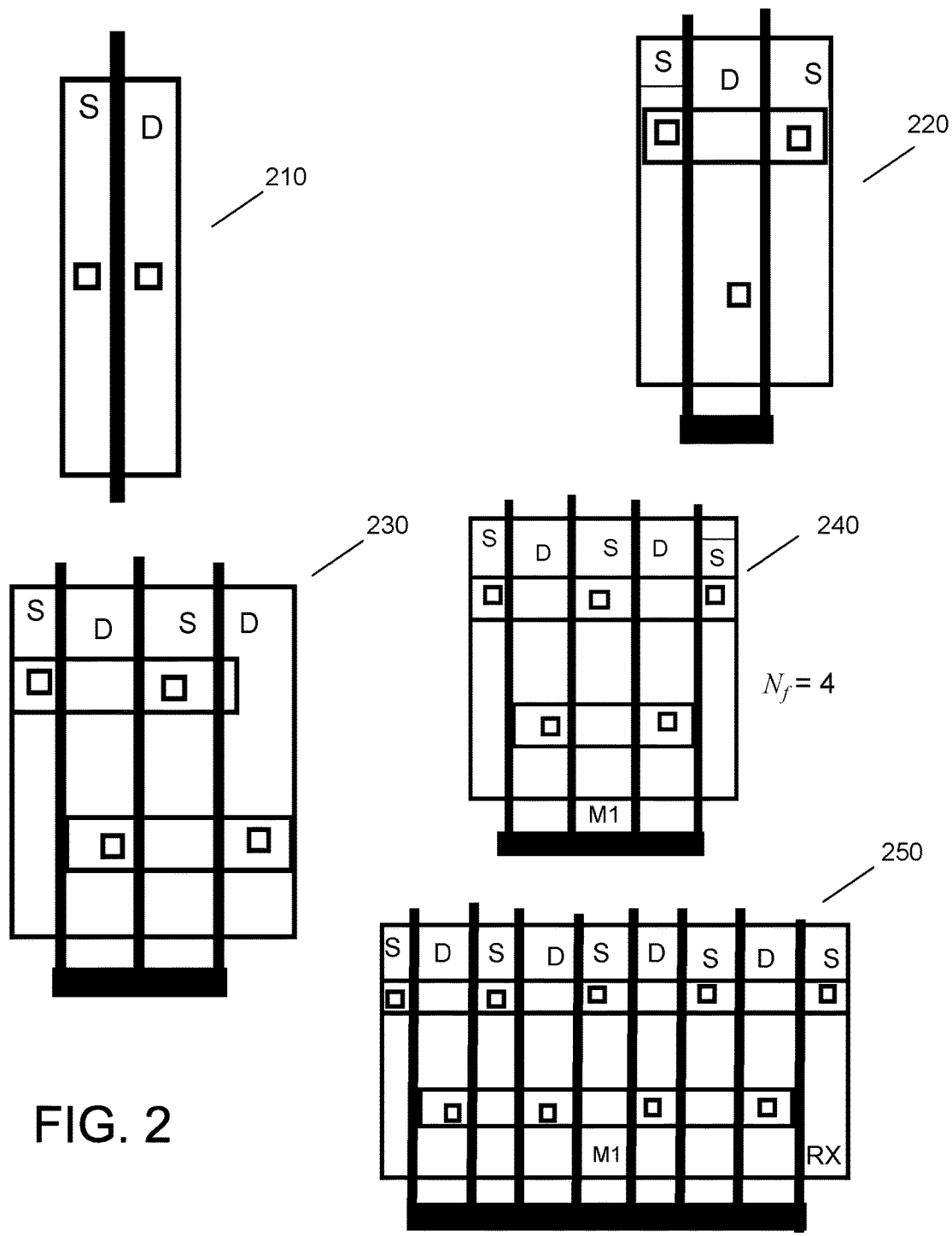
FIGS. 2-5 show example semiconductor devices in accordance with aspects of the invention.

The present invention generally relates to determining chip power optimization, and more particularly, to a method and system for determining accurate levels of leakage current and threshold voltage for ensemble semiconductor devices. In particular, the present invention can determine leakage current and threshold voltage levels associated with leakage power for an ensemble device with multiple semiconductor devices with a greater level of accuracy, compared to conventional methods.

In embodiments, the present invention determines the leakage current and threshold voltage by: (i) determining a number m of individual devices that are connected in parallel within an ensemble device; (ii) identifying a sub-threshold slope; (iii) deriving an uplift factor for a leakage current for the ensemble device which is a function of the number m of individual devices within the ensemble device, a standard deviation associated with the uncorrelated random variation in the logarithm of leakage current, a standard deviation associated with the correlated random variation in the logarithm of leakage current, and the sub-threshold slope; (iv) deriving a standard deviation for the uncorrelated variation in the logarithm of leakage current in the ensemble device which decreases with the number m of individual devices but is not inversely proportional to the square root of the number m of individual devices; (v) developing a statistical model for the leakage current of the ensemble device using the number m of individual devices, an uplift factor, the standard deviation for the uncorrelated random variation in the logarithm of leakage current, the standard deviation for the correlated standard variation in the logarithm of leakage current, and the sub-threshold slope; (vi) incorporating the leakage statistical model into a device model (e.g., a sub-threshold drain current model in a FET compact model, a gate leakage current model in a FET compact model, a separate FET Iddq (quiescent supply current) model used for leakage modeling, a gate leakage current model for MOS varactors, etc.) and using the device model for device, circuit, and/or chip simulations; (vii) calculating, when the ensemble device is an ensemble transistor and when the leakage current is the sub-threshold drain current, a device-number (m) dependent shift amount for the average of a single-point threshold voltage of the ensemble transistor and a standard deviation for the uncor- related variation of the single-point threshold voltage which decreases with the number m of individual devices but is not inversely proportional to the square root of the number m of individual devices; and/or (viii) incorporating the device-number dependent shift amount in the threshold voltage and the variation of the threshold voltage to a compact model of the ensemble transistor and using the compact model for circuit simulations.

In embodiments, the number of individual devices connected in parallel in a planar FET is a total finger number within the ensemble FET. For example, when every multiplicity has the same finger number, the number (m) of devices equals the product of multiplicity ($p_{ar}$) and the finger number per multiplicity ($N_f$), $m=p_{ar}N_f$. In embodiments, the number of individual devices connected in parallel in a finFET device is the total fin number within the finFET device. For example, when every multiplicity has a same finger number, $N_f$, and every finger has a same fin number, $N_{fin}$, the total number (m) of individual devices connected in parallel is the product of the multiplicity ($p_{ar}$), the finger number per multiplicity ($N_f$), and the fin number $N_{fin}$ per finger, $m=p_{ar}N_f N_{fin}$.

In embodiments, the shift amount in the average of a single-point threshold voltage of the ensemble transistor is a function of the number of individual devices, the standard deviation associated with the uncorrelated random variation of the threshold voltage of a single device, the uplift factor, and the sub-threshold slope.

As a result, the present invention can model various leakage and threshold voltage characteristics of FET devices with a greater level of accuracy for single and multi-finger devices in both corner simulations, Monte Carlo simulations, and/or any other type of simulations. This ensures that the mean and tolerance values from Monte Carlo simulations and/or corner simulations for leakage and threshold voltage characteristics provide a greater level of accuracy than other types of characterization and modeling methods. By determining a greater level of accuracy of leakage and threshold voltage characteristics, a circuit and/or chip can be designed with minimal leakage and greater power optimization.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

FIG. 1 shows an illustrative environment 10 for managing the processes in accordance with the invention. To this extent, environment 10 includes a server 12 or other computing system that can perform the processes described herein. In particular, server 12 includes a computing device 14. The computing device 14 can be resident on a network infrastructure or computing device of a third party service provider (any of which is generally represented in FIG. 1).

The computing device 14 also includes a processor 20 (e.g., CPU), memory 22A, an I/O interface 24, and a bus 26. The memory 22A can include local memory employed during actual execution of program code, bulk storage, and cache memories which provide temporary storage of at least some program code in order to reduce the number of times code must be retrieved from bulk storage during execution. In addition, the computing device includes random access memory (RAM), a read-only memory (ROM), and an operating system (O/S).

The computing device 14 is in communication with external I/O device/resource 28 and storage system 22B. For example, I/O device 28 can comprise any device that enables an individual to interact with computing device 14 (e.g., user interface) or any device that enables computing device 14 to communicate with one or more other computing devices using any type of communications link. The external I/O device/resource 28 may be for example, a handheld device, PDA, handset, keyboard etc.

In general, processor 20 executes computer program code (e.g., program control 44), which can be stored in memory 22A and/or storage system 22B. Moreover, in accordance with aspects of the invention, program control 44 controls an analysis engine 60, e.g., the processes described herein. Analysis engine 60 can be implemented as one or more program code in program control 44 stored in memory 22A as separate or combined modules. Additionally, analysis engine 60 may be implemented as separate dedicated processors or a single or several processors to provide the function of these tools. While executing the computer program code, the processor 20 can read and/or write data to/from memory 22A, storage system 22B, and/or I/O interface 24. The program code executes the processes of the invention. The bus 26 provides a communications link between each of the components in computing device 14.

The computing device 14 can comprise any general purpose computing article of manufacture capable of executing computer program code installed thereon (e.g., a personal computer, server, etc.). However, it is understood that computing device 14 is only representative of various possible equivalent-computing devices that may perform the processes described herein. To this extent, in embodiments, the functionality provided by computing device 14 can be implemented by a computing article of manufacture that includes any combination of general and/or specific purpose hardware and/or computer program code. In each embodiment, the program code and hardware can be created using standard programming and engineering techniques, respectively.

Similarly, server 12 is only illustrative of various types of computer infrastructures for implementing the invention. For example, in embodiments, server 12 comprises two or more computing devices (e.g., a server cluster) that communicate over any type of communications link, such as a network, a shared memory, or the like, to perform the process described herein. Further, while performing the processes described herein, one or more computing devices on server 12 can communicate with one or more other computing devices external to server 12 using any type of communications link. The communications link can comprise any combination of wired and/or wireless links; any combination of one or more types of networks (e.g., the Internet, a wide area network, a local area network, a virtual private network, etc.); and/or utilize any combination of transmission techniques and protocols.

In embodiments, analysis engine 60 provides analysis and modeling capabilities that improves the accuracy of modeling leakage current and threshold voltage for an ensemble device (e.g., a circuit, a chip, different devices within a circuit such as a transistor, etc.) that includes multiple individual devices, such as FETs. In one embodiment (for planar FETs), the number of multiple individual devices that are connected in parallel is counted by the total finger number. For example, the number of devices is equal to the product of a multiplicity number ($p_{ar}$) and the finger number ($N_f$) per multiplicity when each multiplicity has the same finger number ($N_f$). Alternatively, the number of devices connected in parallel in a finFET device is the total fin number in the device. For example, the number of devices is the product of the multiplicity number ($p_{ar}$), the finger number ($N_f$) per multiplicity, and the fin number ($N_{fin}$) per finger.

In embodiments, analysis engine 60 can develop a statistical model for threshold voltage at saturation and/or at linear region. In embodiments, the statistical model can be determined by using the number of individual devices, uncorrelated standard deviation, a body factor coefficient, and thermal energy. FIGS. 8 and 9A-9D further describe how the statistical model for threshold voltage is derived and applied.

In embodiments, analysis engine 60 can develop a statistical model for leakage current by using the number of individual devices and other statistical features that include an uplift factor, uncorrelated standard deviations, standard deviation, and a sub-threshold slope. In embodiments, the statistical model is derived from an expression of the total current which is a function of channel length, channel width, gate bias voltage, substrate voltage, temperature, body factor coefficient, thermal energy, and threshold voltage. The expression is analyzed and reduced to an expression with standard deviations ($\sigma_{uncor}$ and $\sigma_{cor}$) for both uncorrelated random variation and correlated random variation. In embodiments, a statistical factor (e.g., $\exp(\sigma_{cor}G/nv_t)$) defines a function and the random variable G in the function can be associated with a particular probability distribution and/or any other type of probability feature. As a result, the uplift factor, the standard deviations, both correlated and uncorrelated, and the sub-threshold slope are derived and used to statistically model leakage current for both Monte Carlo and nominal corner simulations. FIGS. 10 and 11A-11D further describe how the statistical model for leakage current is derived and applied.

FIGS. 2-5 show example devices connected in parallel in accordance with aspects of the present invention. It should be understood by those of skill in the art that the devices shown in FIGS. 2-5 are only illustrative devices implemented with the present invention, and that a host of other devices are also contemplated in the present invention. In particular, in FIG. 2, device 210 of the four example devices is a single-finger planar FET and, as a contrast, the remaining four example devices are multi-finger planar FETs. In embodiments, a semiconductor device can be a transistor (e.g., a MOSFET) that uses an electric field to control the conductivity of a channel located within semiconductor material (e.g., silicon). In embodiments, a finger can be a single gate structure (i.e., a planar FET). Device 210 shows a one-finger FET, where $N_f=1$; device 220 shows a two-finger FET, where $N_f=2$; device 230 shows a three-finger FET, where $N_f=3$; device 240 shows a four finger FET, where $N_f=4$; and device 250 shows an eight finger FET, where $N_f=8$. In devices 210, 220, 230, 240, and 250, the symbol "S" represents a source region and the symbol "D" represents a drain region within the FET. Furthermore, in devices 240 and 250, M1 can represent a metal layer (e.g., tungsten, copper, titanium, etc.), and RX can represent an active level region (e.g., active level silicon region).

Figure 3:
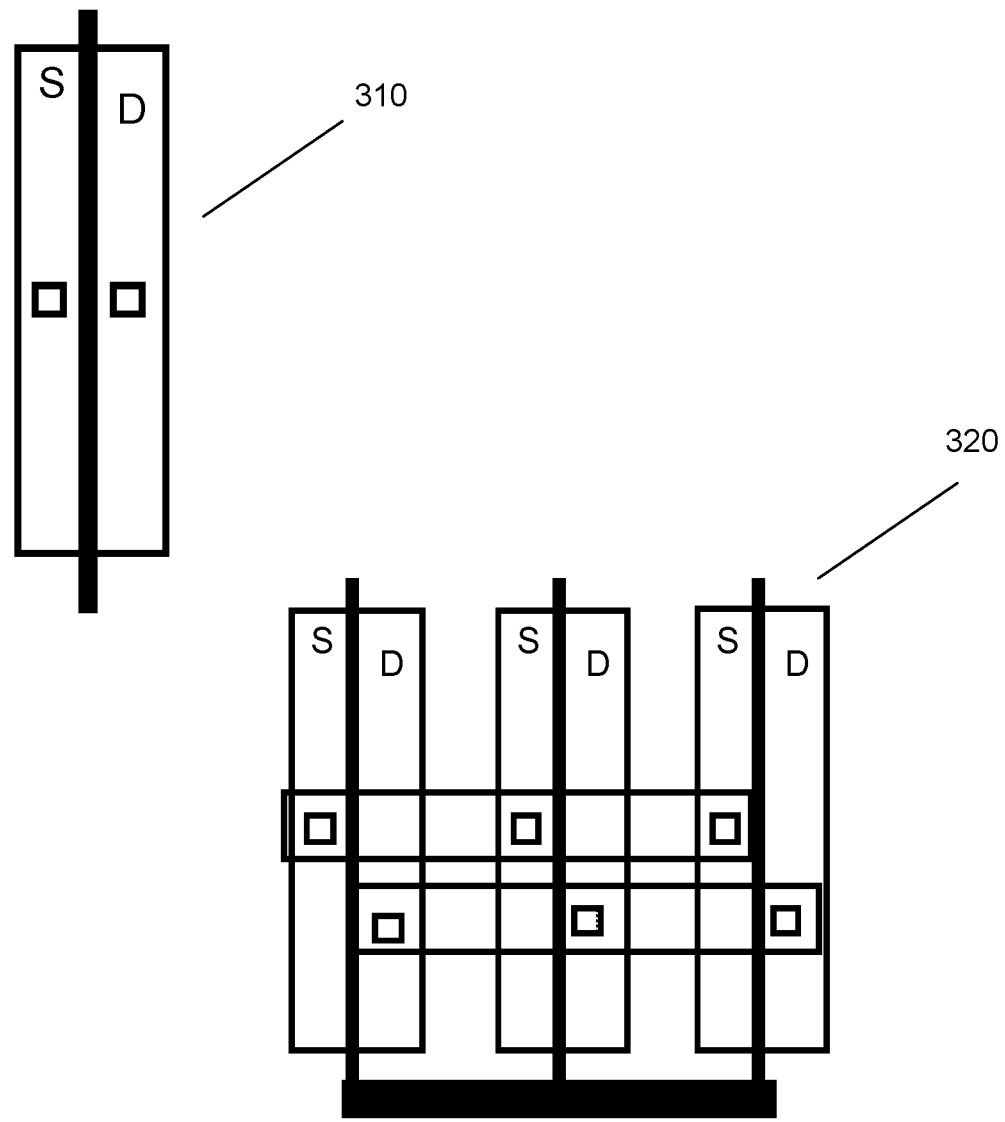

In FIG. 3, device 310 is a single complete FET (multiplicity $p_{ar}=1$). Device 320 shows three complete devices connected in parallel, namely, multiplicity $p_{ar}=3$. In devices 310 and 320, the symbol "S" represents a source and the symbol "D" represents a drain within a FET configuration.

Figure 4:
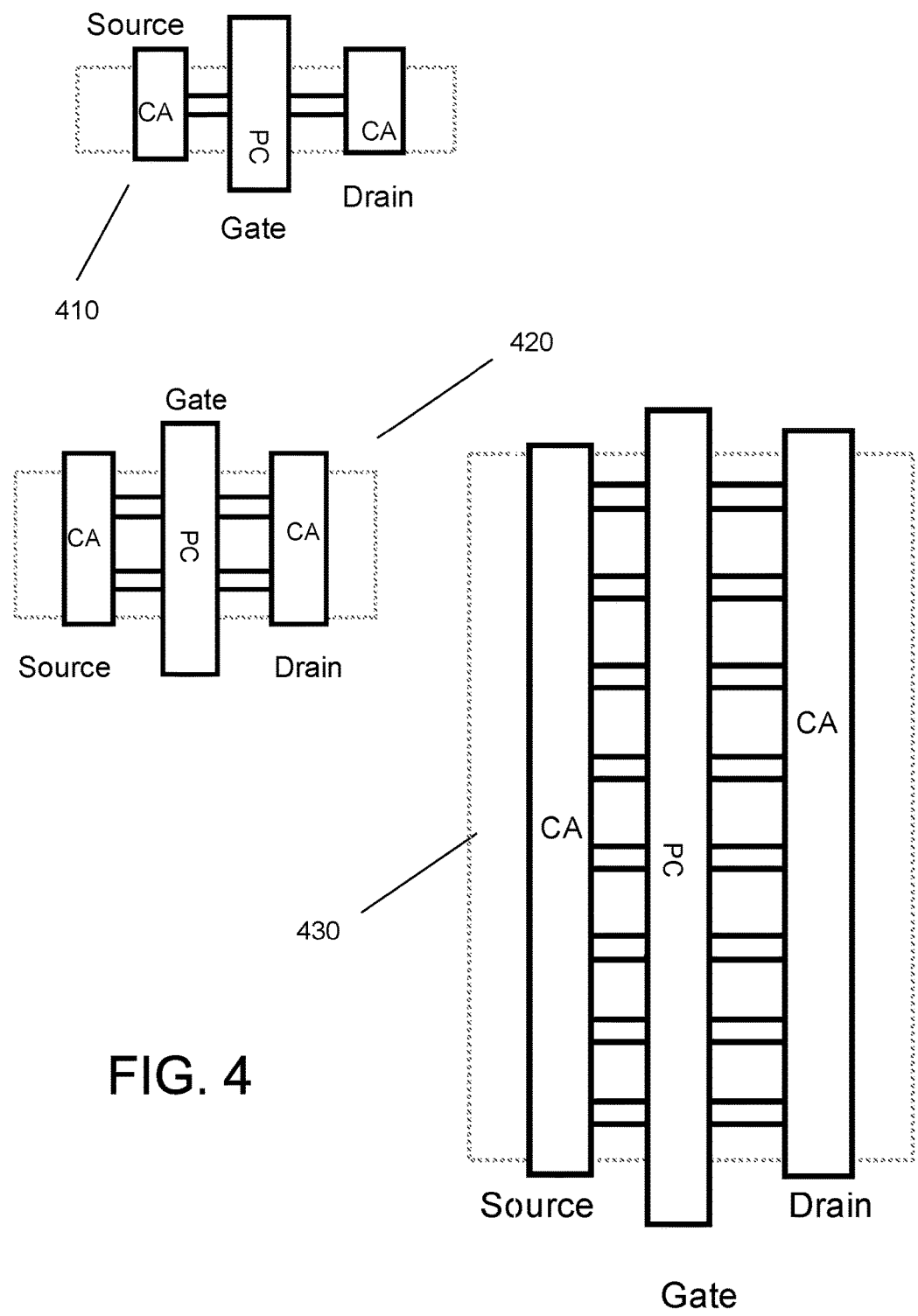

FIG. 4 shows example fin devices connected in parallel in accordance with aspects of the present invention. In embodiments, a multi-fin FET includes fin structures that are connected to drain and/or source structures within the FET. Device 410 shows a device with one fin, where $N_{fin}=1$; device 420 shows a device with two fins, where $N_{fin}=2$; device 430 shows a device with eight fins, where $N_{fin}=8$. In devices 410, 420, and 430, "CA" represents a local interconnect and "PC" represents a polysilicon connection. In embodiments, the number of devices, m, is a product of $p_{ar}$, $N_f$ and $N_{fin}$, or, more generally, the number of devices, m, is the total number of individual devices that are connected in parallel with the ensemble device.

Figure 5:
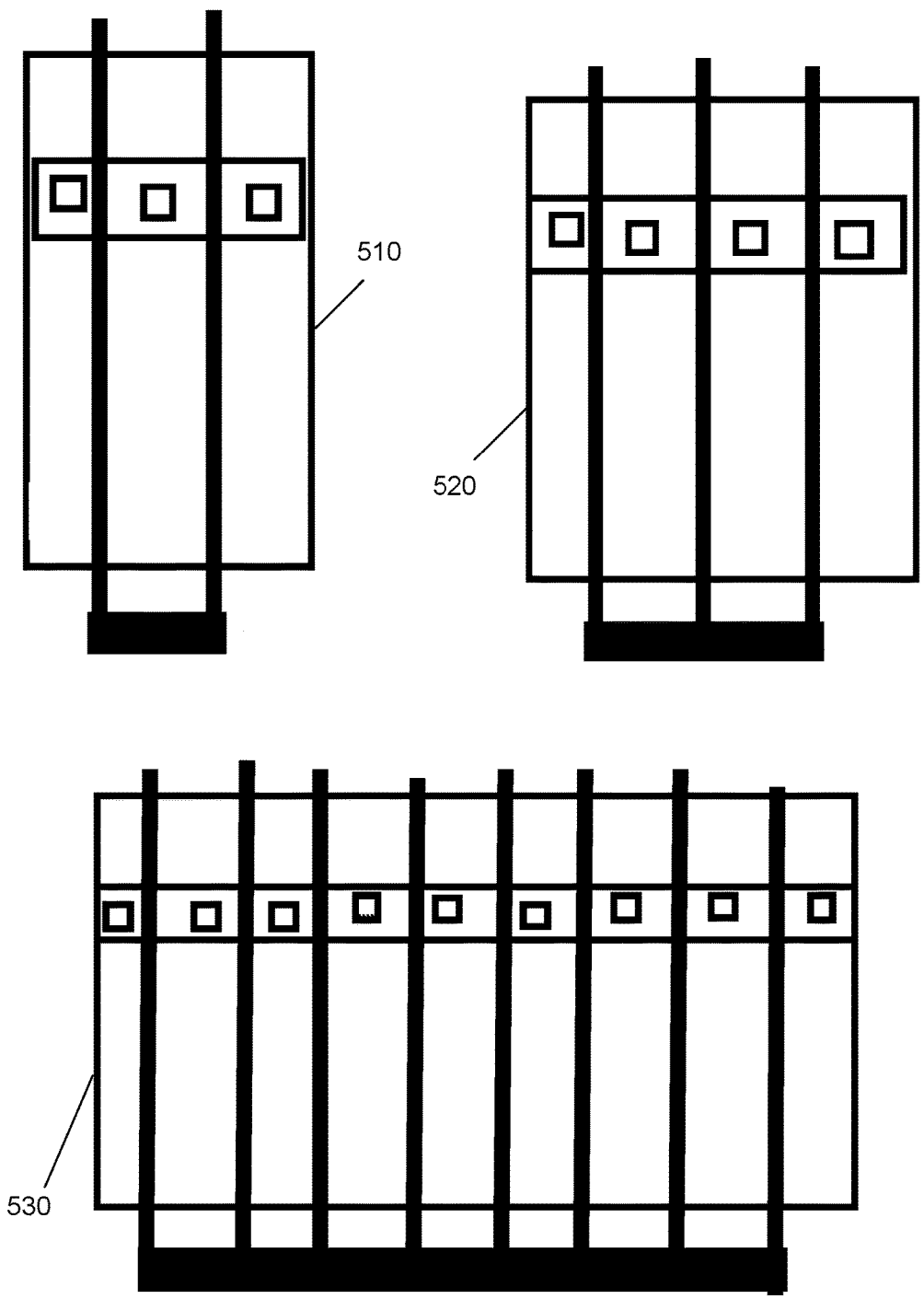

In FIG. 5, each of the example devices are multi-finger MOS varactors. In embodiments, a varactor is a capacitor device that can provide electrically controllable capacitance. Device 510 shows a device with a single-finger MOS varactor, where $N_f=1$; device 520 shows a device that is a three-finger MOS varactor, where $N_f=3$; device 530 shows a device that is an eight finger MOS varactor, where $N_f=8$. In embodiments, the number of devices, m, is the number of fingers in the MOS varactor.

Figure 6:
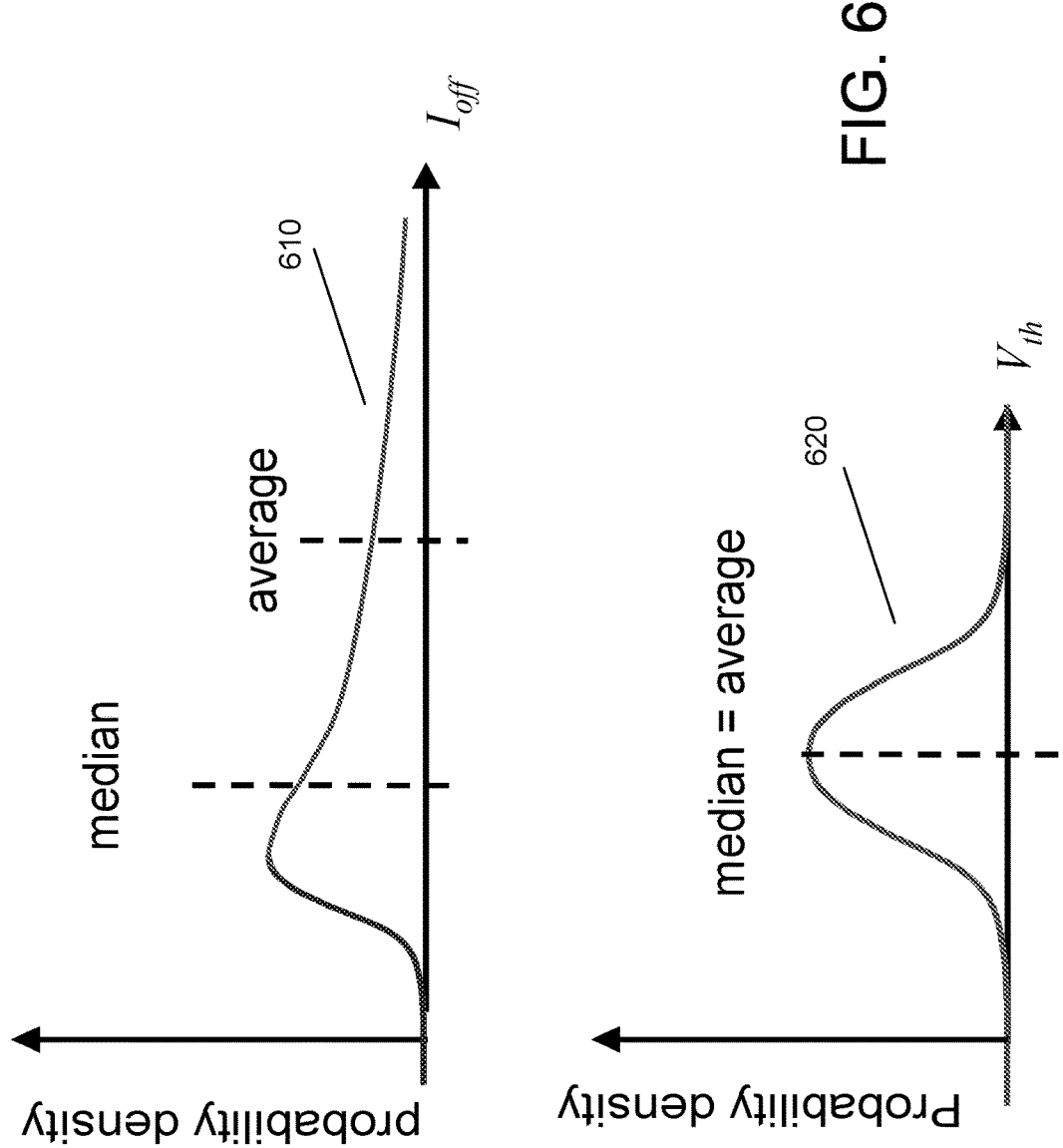
FIG. 6 shows example probability density curves for various semiconductor electrical features in accordance with aspects of the invention.

FIG. 6 shows example probability density curves in accordance with aspects of the present invention. Curve 610 shows a probability density curve for the "off"/leakage current for a single FET device. In embodiments, curve 610 shows an asymmetrical relationship for the "off"/leakage current since the median and the mean (i.e., average) are not the same, and the relationship is shown as a log Gaussian distribution. Further, the ratio of the mean to the median is known as the uplift factor. Curve 620 shows a probability density curve for the threshold voltage or for the logarithm of the "off"/leakage current. In embodiments, curve 620 shows a symmetrical relationship, with the mean being equal to the median, and shown as a Gaussian distribution. In embodiments, the "off" current is related to the threshold voltage as $I_{off,1}$ being proportional to $\exp(-V_{th}/nv_t)$. In embodiments, "$I_{off,1}$" is the current at the "off" state, $V_{th}$ is the threshold voltage, n is the body factor coefficient, and $v_t$ is the thermal energy.

Figure 7:
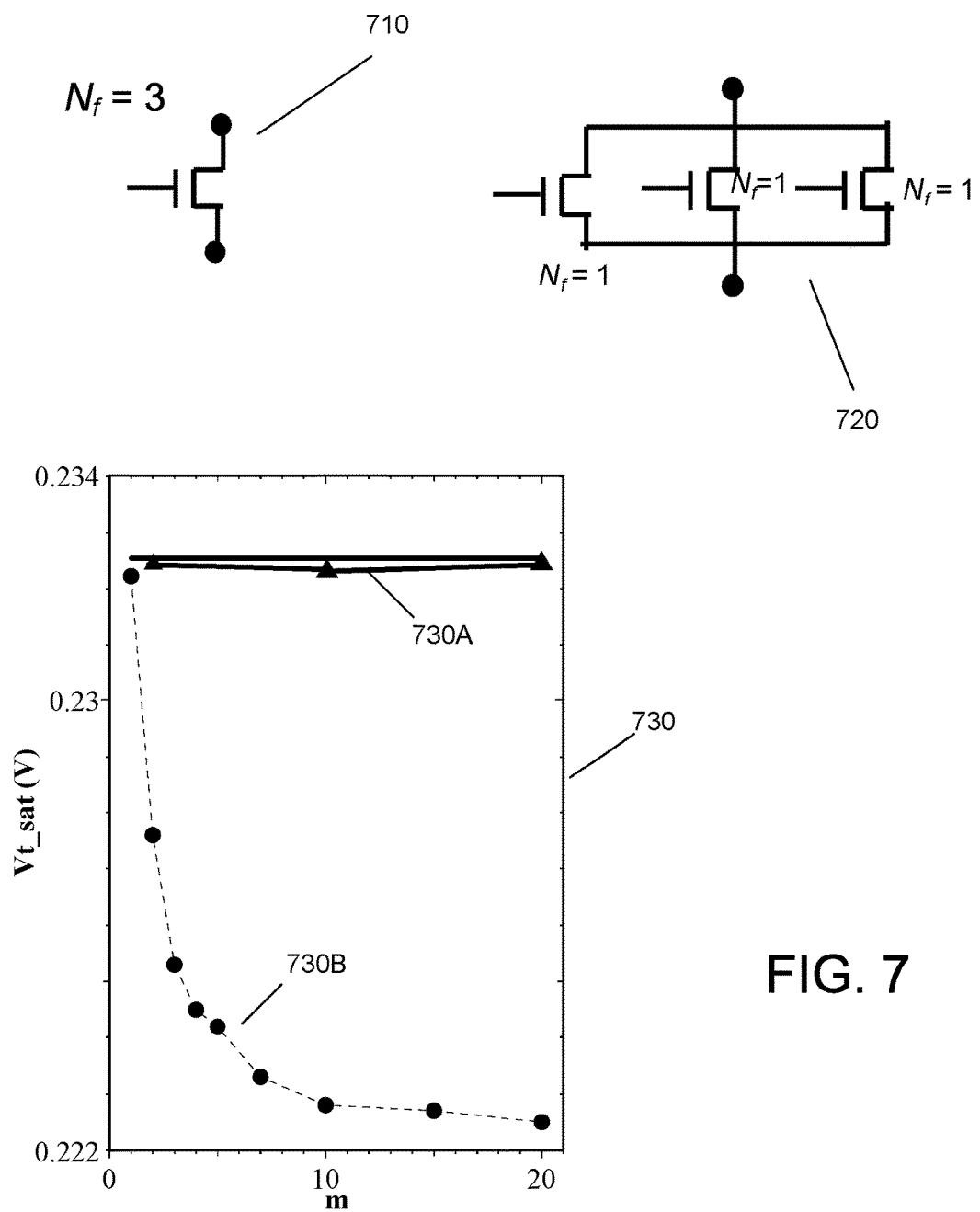
FIG. 7 shows an example graphical representation of various semiconductor electrical features in accordance with aspects of the invention.

FIG. 7 shows an example graphical representation of various semiconductor electrical features in accordance with aspects of the invention. FIG. 7 shows model 710, model 720, and graph 730. In embodiments, model 710 and model 720 are two different representations of a same ensemble FET device with $m=N_f=3$. Model 710 represents the ensemble FET using a single FET instance with $m=N_f=3$, whereas model 720 represents the ensemble FET using three FET instances (each with $m=N_f=1$).

In embodiments, curve 730A in graph 730 shows average single-point threshold voltage vs. device number m (i.e., number m of individual devices) from running Monte Carlo simulation using model 710, and curve 730B in graph 730 illustrates average single-point threshold voltage as a function of device number m from running Monte Carlo simulation using model 720. As shown in graph 730, the threshold voltage at saturation ($V_{th,sat}$) for curve 730A does not change with increasing device number m; however, for curve 730B, the voltage at saturation decreases with increasing device number m.

Flow Diagram

Figure 8:
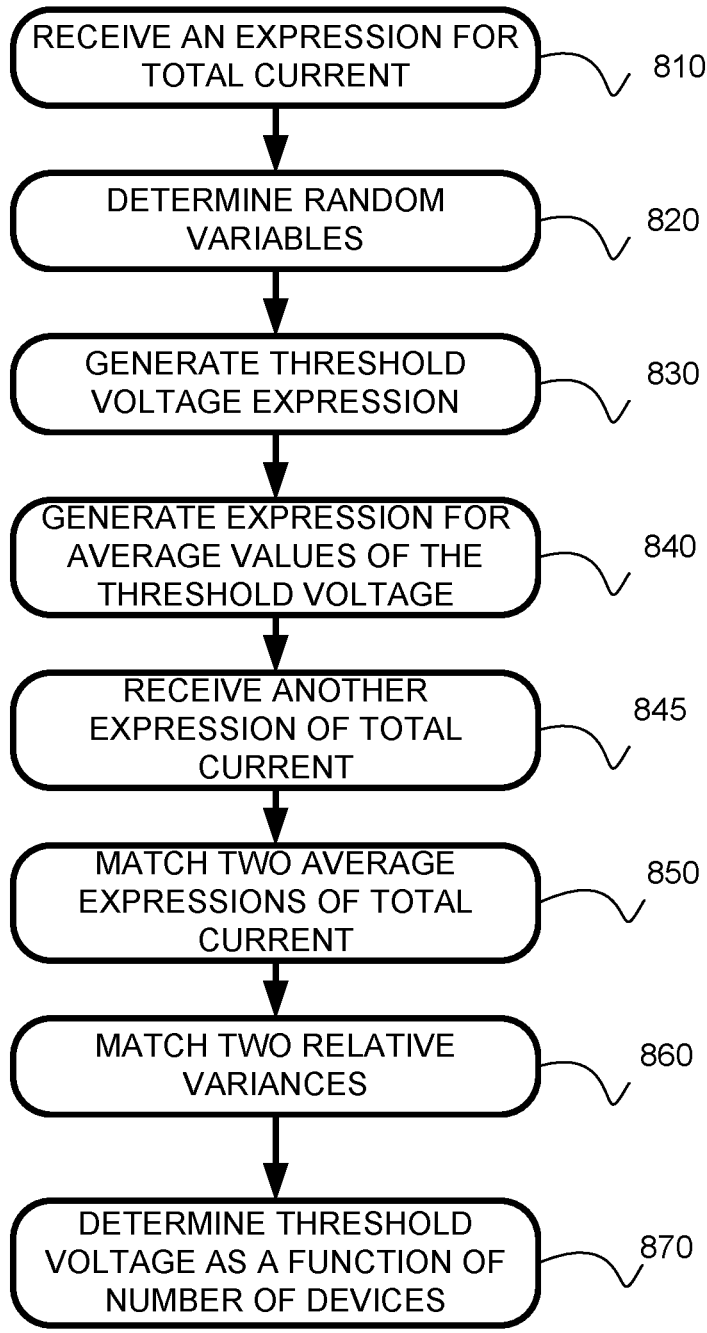
FIG. 8 shows an example flow in accordance with aspects of the invention.

FIG. 8 (and FIG. 10) shows an exemplary flow for performing aspects of the present invention. The steps of FIG. 8 (and FIG. 10) may be implemented in the environment of FIG. 1, for example.

The flowchart and block diagrams in FIG. 8 (and FIG. 10) illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In embodiments, FIG. 8 describes a flow for determining an expression for modeling single-point threshold voltage as a function of the number of devices within an ensemble device. As such, the expression for the threshold voltage can be derived from other expressions by equating expressions to each other and (i) taking the integral of these equations, (ii) the differential of these equations, (iii) generating new random variables based on the equation, and/or (iv) any other type of mathematical function. Also, in embodiments, one or more of the expressions described in FIG. 8 can be stored by an analysis engine or can be inputted into the analysis engine via a user interface.

At step 810, the analysis engine, described in FIG. 1, receives expression (1) for the total current from drain to source ($I_{tot}$) below and around threshold voltage:

$$I_{tot} = \sum_{k=1}^{m} i_k = \sum_{k=1}^{m} f(V_{ds}, V_{sb}, W, L, T, \ldots) \exp\left(\frac{V_{gs} - v_{th,k}}{nv_t}\right). \quad (1)$$

As shown in expression (1), $I_{tot}$ is defined as a summation for the current from drain to source for each individual device, starting from k=1 all the way to k=m, which is the total number of devices within an ensemble device. For example, if there are 3 devices, then a summation is performed for the values associated with the first device (k=1), the second device (k=2), and the third device (k=3). Furthermore, the summation of currents from drain to source for each individual device is equated to a summation of values associated with each individual device within the ensemble device. In embodiments, each $i_k$ (k=1, 2, ..., m) can be expressed as a product of two functions. One function is an exponential function of the ratio of the difference between gate-to-source voltage ($V_{gs}$) and the threshold thermal energy ($v_{th,k}$) and the product of the body coefficient factor (n) and the thermal energy ($v_t$). (Here, $v_t=k_BT/q$, where $k_B$ is the Boltzmann constant, T is absolute temperature, and q is electron charge). The other function is a function of the voltage from drain to source ($V_{ds}$), the width (W) of a channel in the individual device, the length (L) of the channel in the individual device, the temperature (T) in the individual device, and/or other factors, but is independent of gate-to-source voltage ($V_{gs}$). The statistical average of the total current $I_{tot}$ of the ensemble device is equal to the product of the device number m and the statistical average current from drain to source for one device, e.g., $\langle I_{tot}\rangle = m\langle i_1\rangle$.

At step 820, individual threshold voltage instance can be separated into an average value $V_{th,ave}$, a correlated random variation component $\sigma_{cor}G$, and an uncorrelated random component $\sigma_{uncor}g_k$. Here, each of G and $g_k$ (k=1, 2, ..., m) is an independent and normalized random variable (i.e., $\langle G\rangle=\langle g_k\rangle=0$, $\langle G^2\rangle=\langle g_k^2\rangle=1$, but $\langle Gg_k\rangle=0$ and $\langle g_jg_k\rangle=0$ when j≠k), and $\sigma_{cor}$ ($\sigma_{uncor}$) is the standard deviation of correlated (uncorrelated) random variations. As such, the analysis engine generates expression (2):

$$v_{th,k}=V_{th,ave}+\sigma_{cor}G+\sigma_{uncor}g_k, k=1,2,\ldots,m. \quad (2)$$

As shown in expression (2), the threshold voltage in each individual FET is equal to its average value ($V_{th,ave}$), plus a component of correlated random variations ($\sigma_{cor}$) and another component of uncorrelated random variations ($\sigma_{uncor}g_k$). As shown, each index k value (k=1, 2, ..., m)

represents one of multiple devices (total of m devices) within the ensemble device. As expected, the average value $\langle v_{th,k} \rangle$ of individual threshold voltage is $V_{th,ave}$.

In MOSFETs, a single-point threshold voltage ($V_{th}$) definition is often used: $V_{th}$ is gate bias $V_{gs}$ value when total drain current is equal to a fixed threshold value:

$$I_{tot}(V_{gs}=V_{th})=I_{threshold}\equiv i_0 mW/L.$$

For example, $i_0=300$ nA or 100 nA for NFETs and $i_0=70$ nA for PFETs. Here, W is the width of a single FET, and mW is total FET width in an ensemble FET with m individual FETs.

At step 830, the analysis engine determines single-point threshold voltage based on expression (3):

$$V_{th} = V_{gs} = V_{th,ave} + \sigma_{cor}G + \qquad (3)$$

$$nv_t \ln \frac{I_{threshold}}{f(V_{ds}, V_{sb}, W, L, t, \ldots) \sum_{k=1}^{m} \exp\left(-\frac{\sigma_{uncor} g_k}{nv_t}\right)},$$

with $I_{threshold}=mf(V_{ds}V_{sb}, W, L, T, \ldots)$.

In embodiments, expression (3) expresses individual threshold voltage instance $V_{th}$ as a function of the threshold current ($I_{threshold}$), the voltage from drain to source $V_{ds}$, the standard deviation $\sigma_{uncor}$ of uncorrelated random variation for the threshold voltage of each individual device, m uncorrelated random variables ($g_k$, k=1, 2, ..., m), the body coefficient factor (n), and the thermal energy ($v_t$). With $I_{threshold}$ equal to the product of the device number m and a function dependent on the voltage from drain to source $V_{ds}$, at step 840, the analysis engine generates expression (4) for the average value of the threshold voltage as a function of device number m:

$$\langle V_{th}(m) \rangle = V_{th,ave} + nv_t \ln m - nv_t \left\langle \ln \sum_{k=1}^{m} \exp\left(-\frac{\sigma_{uncor} g_k}{nv_t}\right) \right\rangle, \qquad (4)$$

$$\langle V_{th}(1) \rangle = V_{th,ave}.$$

In embodiments, the average threshold voltage of an ensemble FET with m devices is equal to the average threshold voltage of a single FET plus a shift amount. The shift amount in average threshold voltage depends on a statistical average of the natural logarithm of a summation of m exponential values that involve the uncorrelated random variations.

At step 845, the analysis engine receives another expression (5) for the total current from drain to source below and around threshold voltage:

$$I_{tot} = mf(V_{ds}, V_{sb}, W, L, T, \ldots) \exp\left(\frac{V_{gs} - V_{th,m} - V_{th\_shift,m}}{nv_t}\right), \qquad (5)$$

with $$V_{th,m} = V_{th,ave} + \sigma_{cor}G + \sigma_{uncor,m}g,$$

where each of G and g is an independent normalized random variable ($\langle G \rangle = \langle g \rangle = 0$, $\langle G^2 \rangle = \langle g^2 \rangle = 1$, and $\langle Gg \rangle = 0$) and $\sigma_{uncor,m}$ is the standard deviation of the uncorrelated random variation for the threshold voltage of the ensemble FET. Expression (5) introduces a shift amount $V_{th\_shift,m}$ in average threshold voltage.

At step 850, the analysis engine matches two average expressions of total current, $\langle I_{tot} \rangle = m \langle i_1 \rangle$.

This leads to:

$$m\exp\left(-\frac{V_{th\_shift,m}}{nv_t} + \frac{\sigma_{uncor,m}^2}{2(nv_t)^2}\right) = m\exp\left(\frac{\sigma_{uncor}^2}{2(nv_t)^2}\right),$$

and generates expression (6) which relates the shift amount $V_{th\_shift,m}$ in average threshold voltage to a difference between the uncorrelated variances of an m-device ensemble FET and a single-device FET:

$$V_{th\_shift,m} = \frac{\sigma_{uncor,m}^2 - \sigma_{uncor}^2}{2nv_t}. \qquad (6)$$

In embodiments, the shift amount in average one-point threshold voltage is the change in average one-point threshold voltage between two ensemble devices that have different device numbers $m_1$ and $m_2$ (each individual device has identical length and width). For example, in FIG. 9A, the saturated threshold voltage (i.e., when drain bias $V_{ds}=V_{DD}$) is 0.232 V for $m_1=1$, and the saturated threshold voltage is 0.222 V for $m_2=20$, thus the shift/change amount in saturated threshold voltage is –0.010 V from a single-finger FET to a corresponding 20-finger FET. At step 860, the analysis engine matches the two relative variances at $\sigma_{cor}=0$:

$$\frac{\sigma_{Itot}^2}{\langle I_{tot} \rangle^2} = \frac{\sigma_{i1}^2}{m \langle i_1 \rangle^2}. \qquad (7)$$

This leads to expression (8) which relates the uncorrelated standard deviation of an m-device ensemble FET to that of a single-device FET, $$\exp[(\sigma_{uncor,m}/nv_t)^2] - 1 = \frac{\exp[(\sigma_{uncor}/nv_t)^2] - 1}{m}. \qquad (8)$$

At step 870, the analysis engine determines an expression (9) for determining average threshold voltage as a function of number m of devices:

$$\langle V_{th}(m) \rangle = V_{th,ave} - nv_t \left\langle \ln \exp\left(-\frac{V_{th\_shift}}{nv_t}\right) \right\rangle = \qquad (9)$$

$$V_{th,ave} + V_{th\_shift,m} = \langle V_{th}(1) \rangle + V_{th\_shift,m}.$$

Based on expression (9) and using expressions (6) and (8), the analysis engine provides an expression (10) for a shift in the average of the single-point threshold voltage as a function of device number m and single-device's uncorrelated standard deviation, $$\langle V_{th}(m)\rangle - \langle V_{th}(1)\rangle = \quad (10)$$

$$V_{th\_shift,m} = -\frac{nv_t}{2}\ln\left(\frac{m}{1+(m-1)\exp[-(\sigma_{uncor}/nv_t)^2]}\right).$$

Thus, the analysis engine is able to provide a result that estimates the threshold voltage for devices associated with: (i) multi-finger planar FETs; (ii) a number of identical single-finger planar FETs connected in parallel; (iii) multi-finger finFETs, and/or (iv) FETs comprising m identical FETs connected in parallel. As such, the analysis engine provides for a FET analysis model that is consistent regardless of whether the FET has multiple fingers and/or multiple fins. Furthermore, the analysis engine is able to provide accurate threshold voltage values for both threshold voltages at nominal (i.e., mean) values and also average threshold voltages from Monte Carlo simulations for either m=1 or for m≥2 (e.g., one FET instance with $p_{ar}$=m or multiple FET instances that are connected in parallel with $p_{ar}$=1 in each instance).

By way of a non-limiting example, the analysis engine can perform modeling at a particular value for $V_{ds}$ (the drain to source voltage), designated as $V_{DD}$. In embodiments, a nominal run is performed to find the threshold voltage at saturation ($V_{th,sat\_nom}$). Additionally, a Monte Carlo modeling analysis is performed for a single FET instance with m=1, which provides an average threshold voltage $\langle V_{th,sat}(1)\rangle$. Thus, a difference is obtained between the average $V_{th}$ and the nominal threshold voltage value ($V_{th,sat\_nom}$). As such, a fitting coefficient value is determined, $\gamma(V_{DD})=\langle V_{th,sat}(1)\rangle - V_{th,sat\_nom}$. In embodiments, a Monte Carlo simulation is run for several ensemble FETs and an average threshold voltage is obtained, $\langle V_{th,sat}(m)\rangle\rangle$, where each ensemble FET contains m individual devices that are connected in parallel within the ensemble FET (m≥20 and m=2). Next, two threshold voltage shift values are chosen, $\langle V_{th,sat}(m_1)\rangle - \langle V_{th,sat}(1)\rangle$. Again modeling is performed, with $m_1$=2 and $m_2$≥20. However, if $|\langle V_{th,sat}(2)\rangle - \langle V_{th,sat}(1)\rangle|\geq\frac{1}{2}|\langle V_{th,sat}(m_2)\rangle - \langle V_{th,sat}(1)\rangle|$, then the analysis engine may use $m_1$=3 or 4.

Next, the analysis engine solves the following two expressions to find initial values of fitting coefficients $\alpha(V_{DD})$ and $\beta(V_{DD})$:

$$\langle V_{th}(m_1)\rangle - \langle V_{th}(1)\rangle = -\frac{\alpha(V_{ds})}{2}\ln\left(\frac{m_1}{1+(m_1-1)\exp[-\beta(V_{ds})]}\right),$$

$$\langle V_{th}(m_2)\rangle - \langle V_{th}(1)\rangle = -\frac{\alpha(V_{ds})}{2}\ln\left(\frac{m_2}{1+(m_2-1)\exp[-\beta(V_{ds})]}\right).$$

Next, the analysis engine substitutes the $\alpha(V_{DD})$, $\beta(V_{DD})$, and $\gamma(V_{DD})$ values to obtain a threshold voltage expression:

$$V_{th0\_a} = \gamma(V_{ds}) - \frac{\alpha(V_{ds})}{2}\ln\left(\frac{m}{1+(m-1)\exp[-\beta(V_{ds})]}\right).$$

Thus, the threshold voltage expression can be used in the FET model to provide nominal simulations at m=$m_1$, $m_2$, ..., etc. and also to find a difference between a nominal threshold voltage and an average threshold voltage from Monte Carlo modeling. In embodiments, the $\alpha(V_{DD})$ and $\beta(V_{DD})$ values can be adjusted until the difference between the nominal threshold voltage and the average threshold voltage are minimized to the smallest difference possible.

Threshold voltage shift also depends on drain bias $V_{ds}$. In embodiments, the present invention finds the values of $\alpha(V_{ds})$, $\beta(V_{ds})$, and $\gamma(V_{ds})$ at two different drain bias and then uses an interpolation method to find the value of $\alpha(V_{ds})$, $\beta(V_{ds})$, and $\gamma(V_{ds})$ at any drain bias $V_{ds}$. For example, by using $V_{ds}=V_{ds,lin}$ (e.g., $V_{ds,lin}$=0.05 V), the values of $\alpha(V_{ds,lin})$, $\beta(V_{ds,lin})$, and $\gamma(V_{ds,lin})$ are derived. Also, by using $V_{ds}=V_{DD}$, the values of $\alpha(V_{DD})$, $\beta(V_{DD})$, and $\gamma(V_{DD})$ are derived. Thus, $\alpha$ value at any drain bias $V_{ds}$ is obtained through a linear interpolation by using $\alpha(V_{ds,lin})$ and $\alpha(V_{DD})$:

$$\alpha(V_{ds}) = \alpha(V_{ds,lin}) + \frac{V_{ds}-V_{ds,lin}}{V_{DD}-V_{ds,lin}}[\alpha(V_{DD})-\alpha(V_{ds,lin})].$$

Similarly, $\beta(V_{ds})$ can be generated through a linear interpolation by using $\beta(V_{ds,lin})$ and $\beta(V_{DD})$:

$$\beta(V_{ds}) = \beta(V_{ds,lin}) + \frac{\beta(V_{DD})-\beta(V_{ds,lin})}{V_{DD}-V_{ds,lin}}(V_{ds}-V_{ds,lin}),$$

and $\gamma(V_{ds})$ can be generated through a linear interpolation by using $\gamma(V_{ds,lin})$ and $\gamma(V_{DD})$:

$$\gamma(V_{ds}) = \gamma(V_{ds,lin}) + \frac{\gamma(V_{DD})-\gamma(V_{ds,lin})}{V_{DD}-V_{ds,lin}}(V_{ds}-V_{ds,lin}).$$

Figure 9A:
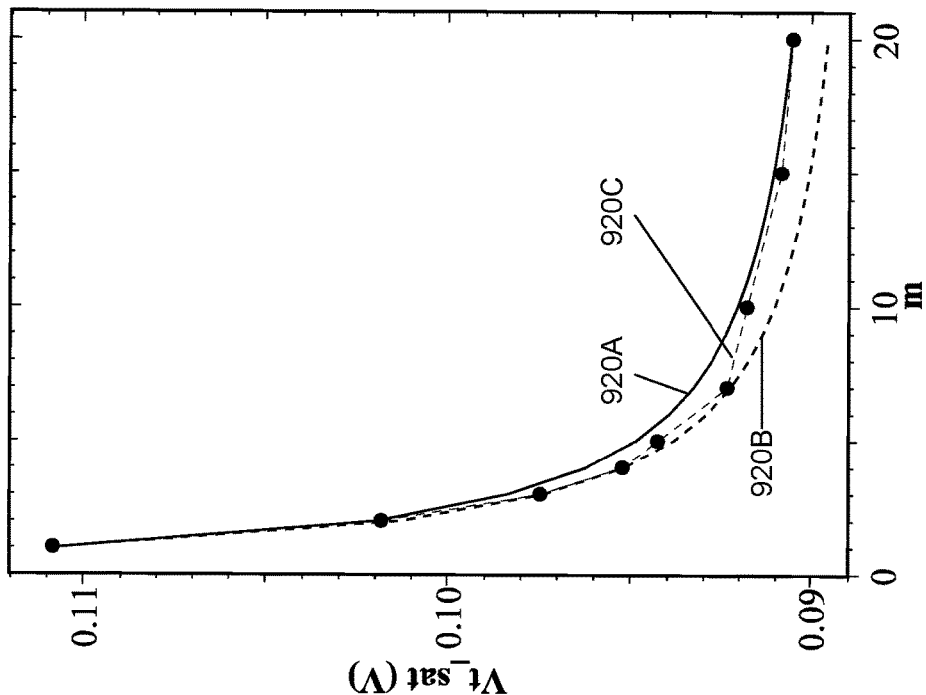

FIGS. 9A-9D show example graphical representations of the physical engine's threshold voltage modeling capabilities in accordance with aspects of the present invention. FIG. 9A shows curves 910A, 910B, and 910C which are curves of saturated threshold voltage versus device number m within an ensemble device in a planar FET for two sets of $nv_t$ and $\sigma_{uncor}$ values. Curves 910A and 910B are derived by using expressions generated by the flow described in FIG. 8. In embodiments, FIG. 9A can be for an N-type FET (NFET) in a 22 nm node semiconductor technology. In embodiments, curve 910A is a curve for threshold voltages in the saturation region ($V_{ds}=V_{DD}$) as a function of device number m values using a particular set of $nv_t$ and $\sigma_{uncor}$ values (e.g., $nv_t$=41 mV and $\sigma_{uncor}$=28 mV). In embodiments, curve 910B is a curve for threshold voltages in the saturation region versus device number m using another set of $nv_t$ and $\sigma_{uncor}$ values (e.g., $nv_t$=46 mV and $\sigma_{uncor}$=31 mV). In FIG. 9A, curve 910C is an average of saturated threshold voltages from running a Monte Carlo simulation using m single-finger NFET instances that are connected in parallel, and curve 910C confirms the shift/change in saturated threshold voltage as a function of device number m.

Figure 9B:
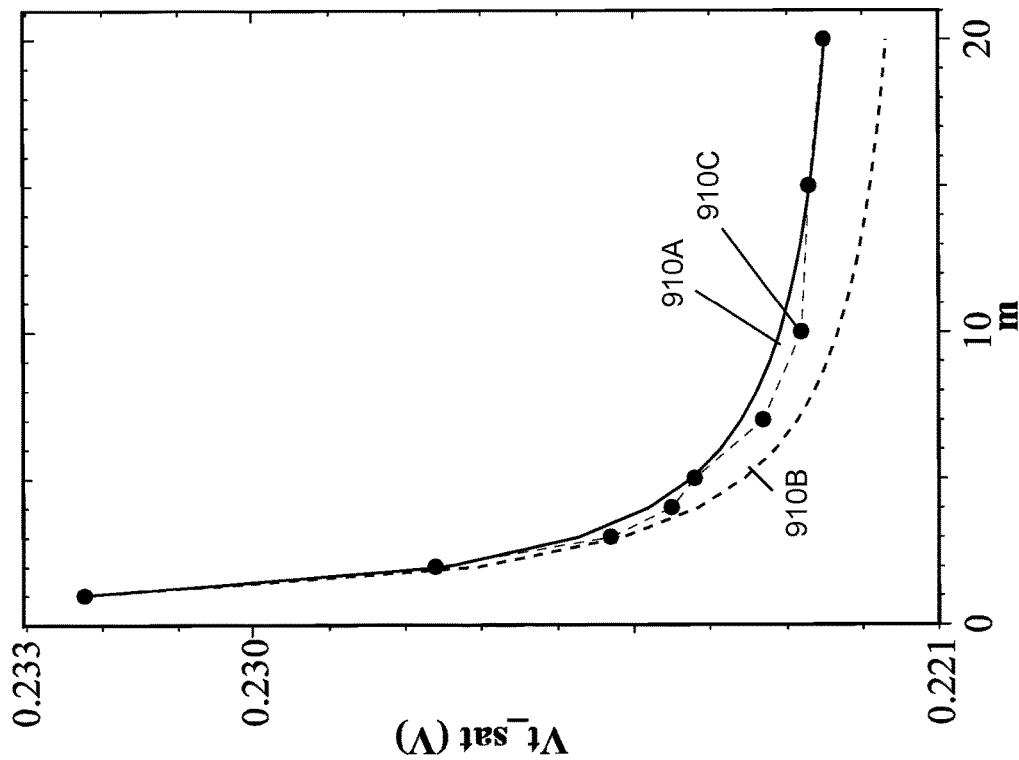

FIG. 9B shows curves 920A, 920B, and 920C which are curves of saturated threshold voltage versus device number m within an ensemble device in a planar FET for two sets of $nv_t$ and $\sigma_{uncor}$ values. In embodiments, FIG. 9B can be for a P-type FET (PFET) in a 22 nm semiconductor technology. Curves 920A and 920B are derived by using expressions generated by the flow described in FIG. 8. In embodiments, curve 920A is a curve for saturated threshold voltage as a function of device number m for a particular set of $nv_t$ and $\sigma_{uncor}$ values (e.g., $nv_t$=50 mV and $\sigma_{uncor}$=46 mV). In embodiments, curve 920B is a curve for saturated threshold voltages versus device number m using another set of $nv_t$ and $\sigma_{uncor}$ values (e.g., $nv_t$=61 mV and $\sigma_{uncor}$=52 mV). In embodiments, 920C is an average of saturated threshold voltages from running a Monte Carlo simulation using m single-finger PFET instances that are connected in parallel, and curve 920C verifies the shift/change in saturated threshold voltage as a function of device number m.

FIG. 9C shows curves 930A, 930B, and 930C which are curves of linear threshold voltage versus device number m within an ensemble device in a planar FET for two sets of $nv_t$ and $\sigma_{uncor}$ values. In embodiments, FIG. 9C can be for an N-type FET (NFET) in a 22 nm semiconductor technology. Curves 930A and 930B are derived by using expressions generated by the flow described in FIG. 8. In embodiments, curve 930A is a curve of linear threshold voltage as a function of device number m for a particular set of $nv_t$ and $\sigma_{uncor}$ values (e.g., $nv_t$=43 mV and $\sigma_{uncor}$=26 mV in). In embodiments, curve 930B is a curve of linear threshold voltages versus device number m using another set of $nv_t$ and $\sigma_{uncor}$ values (e.g., $nv_t$=99 mV and $\sigma_{uncor}$=40 mV). In FIG. 9C, curve 930C is an average of linear threshold voltages from running a Monte Carlo simulation using m single-finger NFET instances that are connected in parallel, and curve 930C illustrates the shift/change in linear threshold voltage as a function of device number m.

FIG. 9D shows curves 940A, 940B, and 940C which are curves of linear threshold voltage versus device number m within an ensemble device in a planar FET for two sets of $nv_t$ and $\sigma_{uncor}$ values. In embodiments, FIG. 9D can be for a P-type FET (PFET) in a 22 nm semiconductor technology. Curves 940A and 940B are derived by using expressions generated by the flow described in FIG. 8. In embodiments, curve 940A is a curve of linear threshold voltage versus device number m using a particular set of $nv_t$ and $\sigma_{uncor}$ values (e.g., $nv_t$=48 mV and $\sigma_{uncor}$=43 mV). In embodiments, curve 940B is a curve of linear threshold voltage as a function of device number m using another set of $nv_t$ and $\sigma_{uncor}$ values (e.g., $nv_t$=155 mV and $\sigma_{uncor}$=77 mV). In FIG. 9D, curve 930D is an average of linear threshold voltages from running a Monte Carlo simulation using m single-finger NFET instances that are connected in parallel, and curve 940C confirms the shift/change in linear threshold voltage as a function of device number m.

Figure 10:
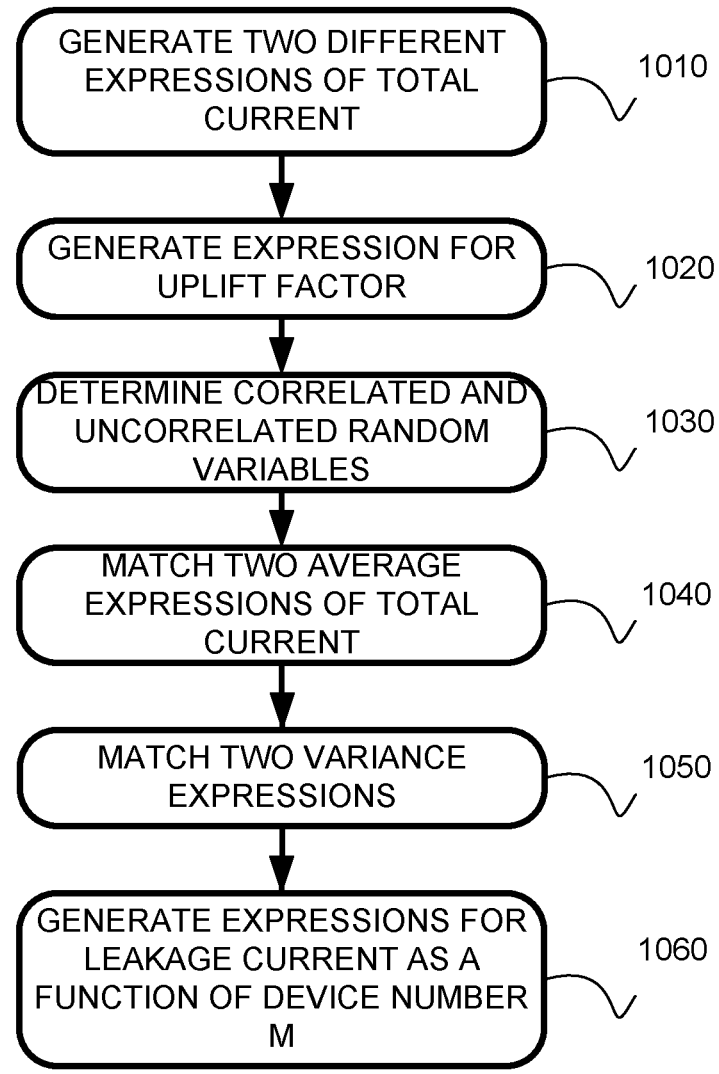
FIG. 10 shows an example flow in accordance with aspects of the invention.

FIG. 10 depicts an example flow for a process in accordance with aspects of the present invention. Specifically, FIG. 10 describes an example flow for determining leakage current, by an analysis engine (such as described in FIG. 1) to provide the optimal power for a particular circuit design.

In embodiments, FIG. 10 describes a flow for determining an expression for modeling threshold voltage as a function of the number of devices within an ensemble device. As such, the expression for the threshold voltage can be derived from other expressions by equating expressions to each other and (i) taking the integral of these equations, (ii) the differential of these equations, (iii) generating new random variables based on the equation, and/or (iv) any other type of mathematical function. Also, in embodiments, one or more of the expressions described in FIG. 10 can be stored by an analysis engine or can be inputted into the analysis engine via a user interface.

At step 1010, the analysis engine generates two different representations of the total leakage current in an ensemble device to create expression (11):

$$I_{tot} = \sum_{k=1}^{m} i_{off,k} \text{ and } I_{tot} = mI_{off,single,effective}(m), \quad (11)$$

with $$i_{off,k} = I_{off,nom}(V_{gs}, V_{ds}, V_{sb}, W, L, T)\exp\left(-\frac{\delta v_{th,k}}{nv_t}\right),$$

$$I_{off,single,effective} = I_{off,nom}(V_{gs}, V_{ds}, V_{sb}, W, L, T)U_{RDF}(m)\exp\left(-\frac{\delta V_{th,m}}{nv_t}\right).$$

In one representation, the total leakage current is a summation of m individual "off"/leakage currents in the ensemble device. In the other representation, the total "off"/leakage current is equal to the product of (i) the number m of devices and (ii) an effective "off"/leakage current expression $I_{off,\,single,\,effective}$ for a single device in the ensemble device. In embodiments, $I_{off,nom}$ is common to both $i_{off,k}$ and $I_{off,\,single,\,effective}$, and is a function of the voltage between the gate and source ($V_{gs}$), channel length of a device (L), channel width of a device (W), the voltage between drain and source ($V_{ds}$), the voltage at the substrate ($V_{sb}$), and the temperature (T). On the other hand, comparing the expression of $I_{off,\,single,\,effective}$ with that of $i_{off,k}$ (k=1, 2, . . . , m), there is a new uplift factor $U_{RDF}(m)$ in $I_{off,\,single,\,effective}$ (which is a function of m) and the exponential factor $\delta V_{th,m}$ in $I_{off,\,single,\,effective}$ which also depends on device number m.

Expression (11) further shows that $I_{tot}$ is also equal to the summation of all of the "off" current in m individual devices within an ensemble device. In other words, expression (11) is used for an ensemble device that contains m individual devices that are connected in parallel within the ensemble device.

Since the total current can be represented by two different expressions, at step 1020, the two expressions are equated to each other statistically and simplified from expression (11) in step 1010 to provide expression (12):

$$mU_{RDF}(m)\exp\left(-\frac{\delta V_{th,m}}{nv_t}\right) \approx \sum_{k=1}^{m} \exp\left(-\frac{\delta v_{th,k}}{nv_t}\right). \quad (12)$$

Thus, in embodiments, the product of device number m, the uplift factor $U_{RDF}(m)$, and the exponential of the valuation of the threshold voltage ($\delta V_{th,m}$) divided by $nv_t$ is equal to the summation of all the exponentials of each valuation of the threshold voltage for a particular device "k" within a total number of m devices divided by $nv_t$. As such, expression (12) provides a statistical relationship between the uplift factor $U_{RDF}$ (which is a function of m) and the variations in the threshold voltages of m devices without the base factor of "off" current, $I_{off,nom}$.

At step 1030, for a single device (e.g., k=1, 2, 3, etc.) within the ensemble device, the random variations in the logarithm of leakage current are separated into an un-correlated random component and a correlated random component as well as identifying a standard deviation associated with the un-correlated variation (e.g., the random variable) and another standard deviation associated with the correlated random variation. Thus, in embodiments for ensemble device, the $\delta V_{th,m}$ is expressed as $$\delta V_{th,m} = \sigma_{cor}G - \sigma_{uncor,m}g, \quad (13)$$

whereas for individual device $$\delta V_{th,k} = \sigma_{cor}G + \sigma_{uncor}g_k, k=1,2,\ldots,m.$$

In embodiments, $\sigma_{cor}$ is the standard deviation of the correlated random variation, G is an independent normalized random variable ($\langle G \rangle=0$, $\langle G^2 \rangle=1$), $\sigma_{uncor}$ is the standard deviation of uncorrelated random variation, and each of $g_k$ (k=1, 2, ..., m) is an independent and normalized random variable ($\langle g_k \rangle=0$, $\langle g_k^2 \rangle=1$, $\langle Gg_k \rangle=0$, and $\langle g_j g_k \rangle=0$ when j≠k).

At step 1040, two averages of total current are matched. Thus, in embodiments, using $\langle I_{tot} \rangle = m \langle i_{off,1} \rangle = m \langle I_{off, single, effective} \rangle$, the expression in step 1020 becomes expression (14):

$$m \exp\left(\frac{\sigma_{cor}^2 + \sigma_{uncor}^2}{2(nv_t)^2}\right) = m U_{RDF}(m) \exp\left(\frac{\sigma_{cor}^2 + \sigma_{uncor,m}^2}{2(nv_t)^2}\right). \quad (14)$$

In embodiments, an uplift factor for the uncorrelated variation of the ensemble device is derived as a function of the device number m, the standard deviation associated with the uncorrelated variation, and the product $nv_t$. Thus, expression (14) can be used to derive expression (15) for the uplift factor $U_{RDF}(m)$:

$$U_{RDF}(m) = \exp\left(\frac{\sigma_{cor}^2 + \sigma_{uncor,m}^2}{2(nv_t)^2}\right). \quad (15)$$

At step 1050, the analysis engine matches two relative variances. In embodiments, with $\sigma_{cor}=0$, an expression that is similar to expression (7) is provided, $$\frac{\sigma_{Itot}^2}{\langle I_{tot} \rangle^2} = \frac{\sigma_{ioff,1}^2}{m \langle i_{off,1} \rangle^2}.$$

Accordingly, the following expression (16) is derived using the above expression:

$$\exp[(\sigma_{uncor,m}/nv_t)^2] - 1 = \frac{\exp[(\sigma_{uncor}/nv_t)^2] - 1}{m}, \quad (16)$$

which is expression (8) obtained previously.

Adding 1 to both sides of expression (16) and then taking the natural logarithm, the analysis engine derives expression (17):

$$\sigma_{uncor,m} = nv_t \sqrt{\ln\left(1 + \frac{\exp[(\sigma_{uncor}/nv_t)^2] - 1}{m}\right)}. \quad (17)$$

Expression (17) is an expression for the standard deviation of the uncorrelated variation in the ensemble device which decreases with increasing device number m but is not inversely proportional to the square root of the device number m.

At step 1060, the analysis engine puts expression (17) into expression (15) to derive an explicit expression (18) for the uplift factor:

$$U_{RDF}(m) = \sqrt{\frac{m}{1 + (m-1)\exp[-(\sigma_{uncor}/nv_t)^2]}}, \quad (18)$$

which varies with m and also has properties that $U_{RDF}(1)=1$ and $U_{RDF}(m; \sigma_{uncor}=0)=1$. The relationship between the up-lift factor here and previous threshold voltage shift is $$U_{RDF}(m) = \exp\left(-\frac{V_{th\_shift,m}}{nv_t}\right).$$

In embodiments, expression (17) can be used to model the leakage of an ensemble device with an arbitrary device number m. Thus, by way of example, when device number m is very large such that $m \gg \exp[(\sigma_{uncor}/nv_t)^2]-1$, the uplift factor (18) becomes device number m independent, $$U_{RDF} = \exp[\tfrac{1}{2}(\sigma_{uncor}/nv_t)^2], \quad (19)$$

the uncorrelated standard deviation for the ensemble device in expression (17) becomes $$\sigma_{uncor,m} = nv_t \frac{\sqrt{\exp[(\sigma_{uncor}/nv_t)^2] - 1}}{\sqrt{m}},$$

and the statistical model (13) for the logarithm of the ensemble FET's leakage current becomes:

$$\delta V_{th,m} \approx \sigma_{cor} G + nv_t \frac{\sqrt{\exp[(\sigma_{uncor}/nv_t)^2] - 1}}{\sqrt{m}} g.$$

Only when device number m is very large such that $m \gg \exp[(\sigma_{uncor}/nv_t)^2]-1$ and when the uncorrelated random variation is small such that $\sigma_{uncor} \ll nv_t$, the uncorrelated standard deviation for the ensemble device in expression (17) becomes the familiar inversely proportional to the square root of device number m, $$\sigma_{uncor,m} = \frac{\sigma_{uncor}}{\sqrt{m}}, \quad (20)$$

and the statistical model (13) for the logarithm of the ensemble FET's leakage current approaches a familiar mismatch scaling relationship:

$$\delta V_{th,m} \approx \sigma_{cor} G + \frac{\sigma_{uncor}}{\sqrt{m}} g.$$

In further embodiments, the Monte Carlo model is to equate $\delta V_{th,m}$ to $(\sigma_{cor} G + \sigma_{uncor,m} g)$.

Accordingly, FIG. 10 shows an expression for the uplift factor, $U_{RDF}(m)$, and also the standard deviation for the uncorrelated random variations that are modeled with a greater level of accuracy for an arbitrary device number m. In embodiments, the uncorrelated standard deviation for an ensemble device as a function of device number m, as shown in expression (17), provides a more accurate scaling relationship between the combined un-correlated random variation for the logarithm of the leakage current in the ensemble device and the device number m in the ensemble device.

In embodiments, the uplift factor as shown in expression (18) shows a scaling relationship versus the device number m. This relationship is also affected by single-device standard deviation $\sigma_{uncor}$. Thus, expression (18) provides a greater level of accuracy in modeling since it takes into consideration the uncorrelated relationship among m devices within an ensemble device.

Figure 11B:
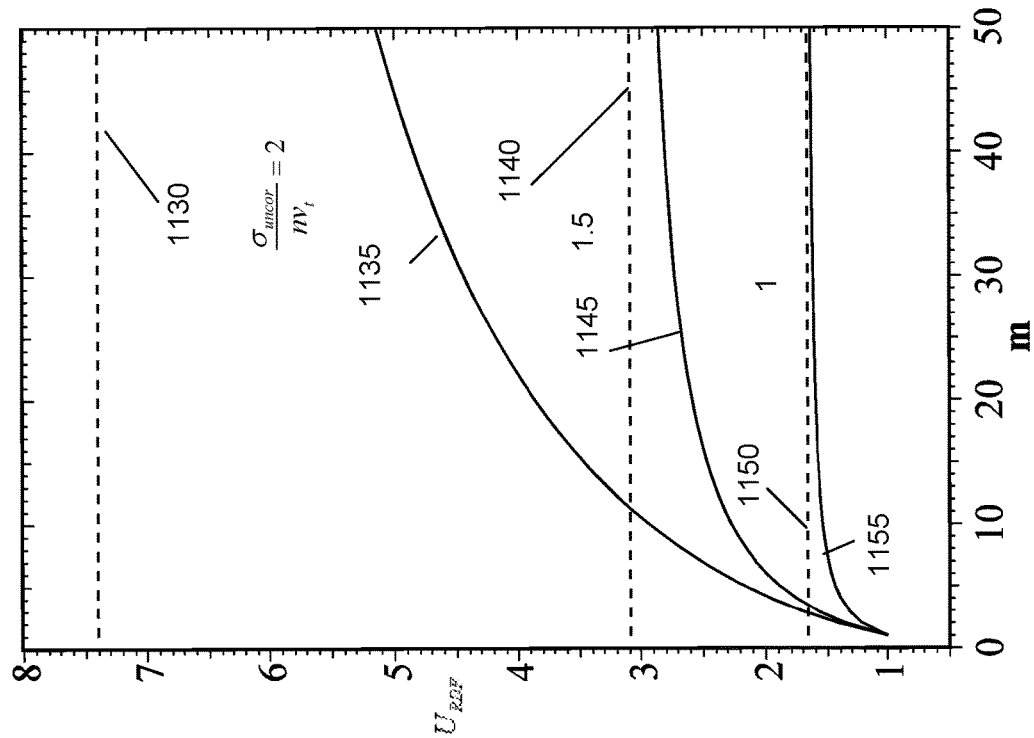
FIGS. 11A-11D show example graphical representations of various semiconductor electrical features in accordance with aspects of the invention.
Figure 11A:
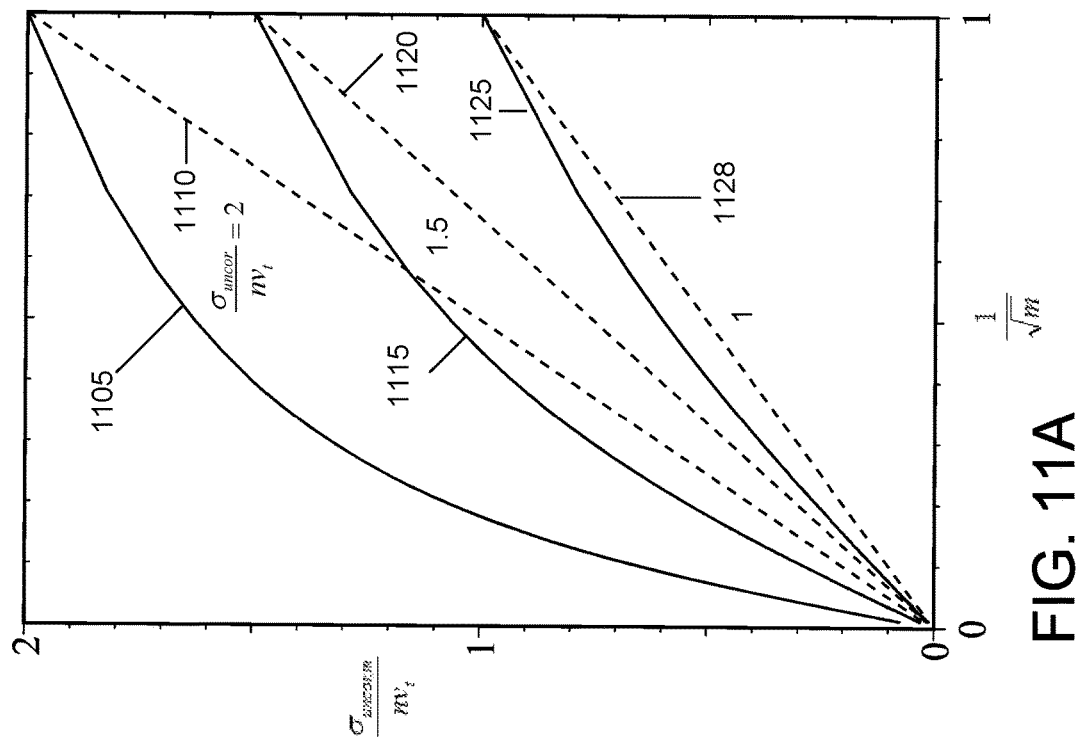

FIGS. 11A-11D show example graphical representations of the physical engine's leakage current modeling capabilities in accordance with aspects of the present invention. FIG. 11A shows curves 1105, 1110, 1115, 1120, 1125, and 1128 on uncorrelated standard deviation of ensemble devices. In embodiments, curves 1105, 1115, and 1125 can be derived by using the expressions derived by the analysis engine as described in FIG. 10. Curves 1105, 1115, and 1125 plot $\sigma_{uncor,m}/nv_t$, as given in expression (17), versus $1/\sqrt{m}$ for 3 different $\sigma_{uncor}/nv_t$ values. In embodiments, curve 1105 uses $\sigma_{uncor}/nv_t=2$, curve 1115 is for $\sigma_{uncor}/nv_t=1.5$, and curve 1125 uses $\sigma_{uncor,m}/nv_t=1$. As a comparison, curves 1110, 1120, and 1128 plot $\sigma_{uncor,m}/nv_t$ versus $1/\sqrt{m}$ not using the expressions derived by the analysis engine as described in FIG. 10. Namely, curves 1110, 1120, and 1128 use expression (20). In particular, curve 1110 uses $\sigma_{uncor}/nv_t=2$ (compare it to curve 1105), and curve 1120 (compare it to curve 1115) uses $\sigma_{uncor}/nv_t=1.5$, and curve 1128 uses $\sigma_{uncor}/nv_t=1.0$ (compare it to curve 1125). Thus, the present invention provides a more accurate description of the uncorrelated standard deviation over different device number m as the value of m increases.

FIG. 11B shows curves 1130, 1135, 1140, 1145, 1150, and 1155 on uplift factors. In embodiments, values of the uplift factor associated with random doping fluctuation (RDF) ($U_{RDF}$) are determined for different values of m. In embodiments, $U_{RDF}$ is associated with the ratio of the mean to the median of the log normal probability distribution curve for leakage current modeling as shown in curve 610 in FIG. 6. In embodiments, curve 1130 is a curve of $U_{RDF}$ for $\sigma_{uncor}/nv_t=2$ without using the expressions generated by the analysis engine and described in FIG. 10. Namely, curve 1130 is a curve of $U_{RDF}$ for $\sigma_{uncor}/nv_t=2$ using expression (19). In contrast, curve 1135 is a curve for $U_{RDF}$ when $\sigma_{uncor}/nv_t=2$ using the expressions generated by the analysis engine and described in FIG. 10. In other words, curve 1135 uses expression (18). Similarly, curve 1140 is a curve for $U_{RDF}$ for $\sigma_{uncor}/nv_t=1.5$, and curve 1150 is a curve for $\sigma_{uncor}/nv_t=1$ and where both curves 1140 and 1150 are derived without using the expressions generated by the analysis engine. Namely, curves 1140 and 1150 use expression (19). In contrast, curve 1145 is a curve for $U_{RDF}$ for $\sigma_{uncor}/nv_t=1.5$ using the expressions generated by the analysis engine and described in FIG. 10; and curve 1155 is a curve for $U_{RDF}$ for $\sigma_{uncor}/nv_t=1$ using the expressions generated by the analysis engine and described in FIG. 10. In other words, curves 1145 and 1155 use expression (18). Thus, as shown in curves 1135, 1145, and 1155, the present invention shows a relationship between the uplift factor $U_{RDF}$ associated with the leakage current and device number m within an ensemble device. This is an improvement over other systems which do not show any change of $U_{RDF}$ with changing device number m within an ensemble device, such as a FET.

Figure 11D:
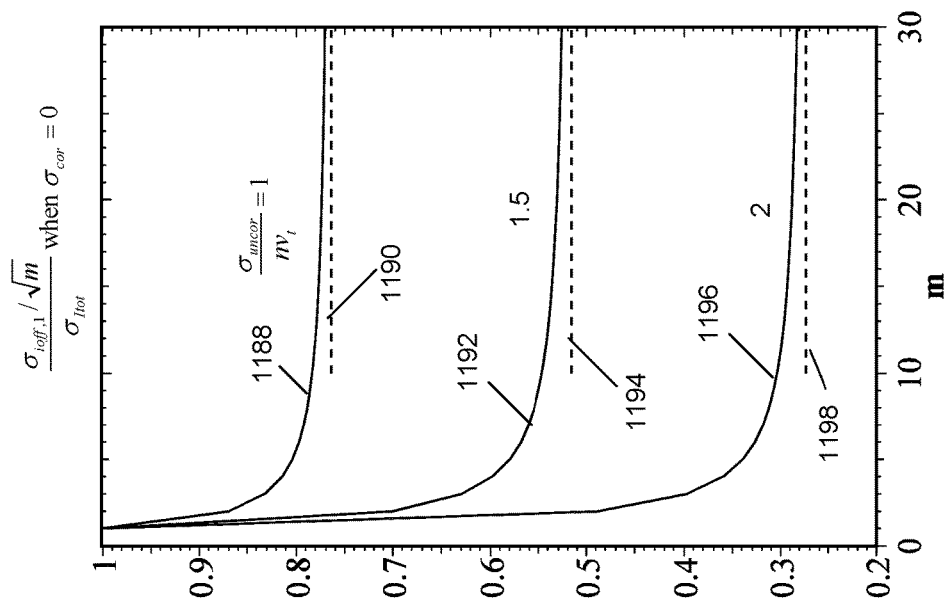
Figure 11C:
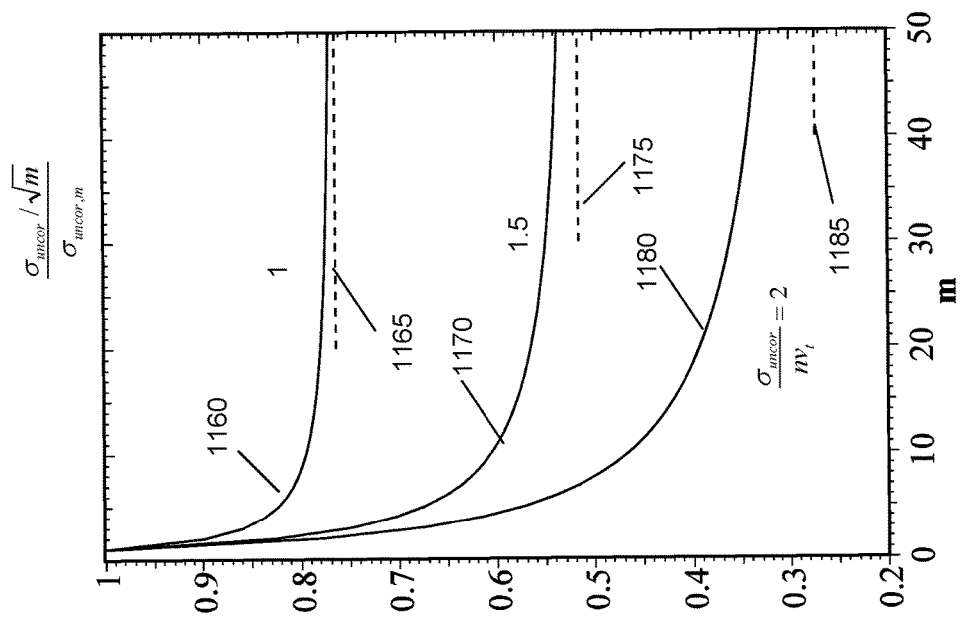

FIG. 11C shows curves 1160, 1170, and 1180, as well as horizontal lines 1165, 1175, and 1185. Curves 1160, 1170, 1180 show the ratio of a commonly used standard deviation $\sigma_{uncor}/\sqrt{m}$ over true standard deviation $\sigma_{uncor,m}$ for different device number m within an ensemble device by using the expressions generated by the analysis engine, described in FIG. 10. Curve 1160 is determined at $\sigma_{uncor}/nv_t=1$, curve 1170 is determined at $\sigma_{uncor}/nv_t=1.5$, and curve 1180 is determined at $\sigma_{uncor}/nv_t=2.0$, respectively. Horizontal lines 1165, 1175, and 1185 indicate the asymptotic values of the ratio $(\sigma_{uncor}/\sqrt{m})/\sigma_{uncor,m}$ when device number m becomes very large. Horizontal line 1165 is determined at $\sigma_{uncor}/nv_t=1$, horizontal line 1175 is determined at $\sigma_{uncor}/nv_t=1.5$, and horizontal line 1185 is determined at $\sigma_{uncor}/nv_t=2.0$, respectively. As shown in curves 1160, 1170, and 1180, the values of the ratio $(\sigma_{uncor}/\sqrt{m})/\sigma_{uncor,m}$ deviate from unity (i.e., 1) significantly. Thus, the present invention provides a new relationship between the uncorrelated standard deviation and the device number m within an ensemble device.

FIG. 11D shows curves 1188, 1192, and 1196 as well as horizontal lines 1190, 1194, and 1198. In embodiments, FIG. 11D shows curves that show a relationship between the standard deviation of the total leakage current and the device number m within an ensemble device. Curves 1188, 1192, and 1196 show the ratio of the standard deviation of the total leakage current when not using the expression generated in FIG. 10 over the standard deviation of the total leakage current when using the expression generated in FIG. 10 versus device number m within an ensemble device. Curve 1188 is determined at $\sigma_{uncor}/nv_t=1$, curve 1192 is determined at $\sigma_{uncor}/nv_t=1.5$, and curve 1196 is determined at $\sigma_{uncor}/nv_t=2.0$, respectively.

Horizontal line 1190 indicates the asymptotic value of curve 1188 when device number m within an ensemble device becomes very large. Horizontal line 1194 shows the asymptotic value of curve 1192 when device number m within an ensemble device approaches infinite. Horizontal line 1198 shows the asymptotic value of curve 1196 when the device number m within an ensemble device approaches infinite. Horizontal line 1190 is determined at a $\sigma_{uncor}/nv_t=1$, horizontal line 1194 is determined at $\sigma_{uncor}/nv_t=1.5$, and horizontal line 1198 is determined at $\sigma_{uncor}/nv_t=2.0$, respectively. Thus, the present invention provides an innovative and more accurate description of leakage current in an ensemble device.

Figure 12:
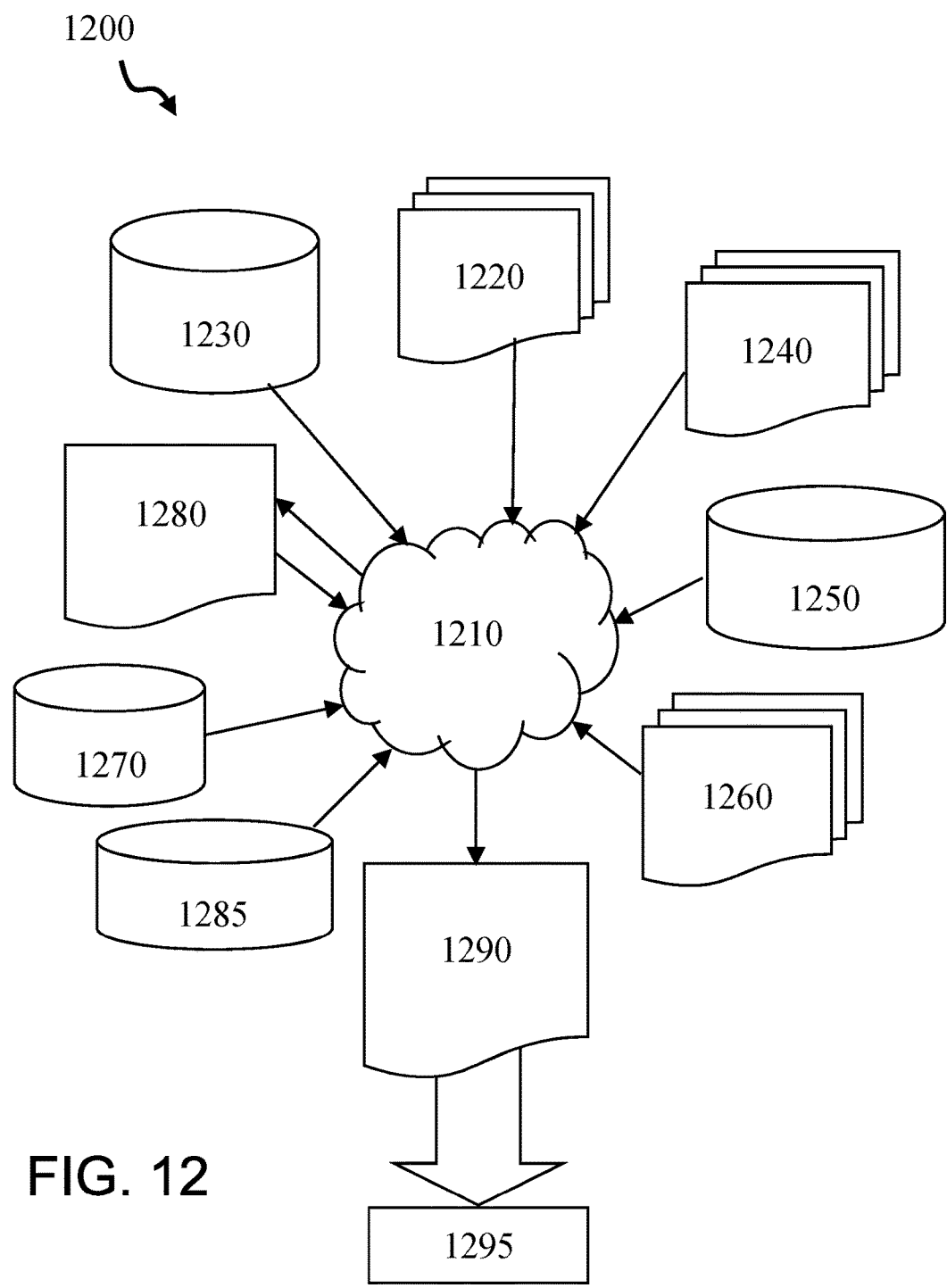
FIG. 12 is a flow diagram of a design process used in semiconductor design, manufacture, and/or test used with the system and method of the present invention.

FIG. 12 shows a block diagram of an exemplary design flow 1200 used for example, in semiconductor IC logic design, simulation, test, layout, and manufacture. Design flow 1200 includes processes, machines and/or mechanisms for processing design structures or devices to generate logically or otherwise functionally equivalent representations of design structures and/or devices. The design structures processed and/or generated by design flow 1200 may be encoded on machine-readable transmission or storage media to include data and/or instructions that when executed or otherwise processed on a data processing system generate a logically, structurally, mechanically, or otherwise functionally equivalent representation of hardware components, circuits, devices, or systems. Machines include, but are not limited to, any machine used in an IC design process, such as designing, manufacturing, or simulating a circuit, component, device, or system. For example, machines may include: lithography machines, machines and/or equipment for generating masks (e.g. e-beam writers), computers or equipment for simulating design structures, any apparatus used in the manufacturing or test process, or any machines for programming functionally equivalent representations of the design structures into any medium (e.g. a machine for programming a programmable gate array).

Design flow 1200 may vary depending on the type of representation being designed. For example, a design flow 1200 for building an application specific IC (ASIC) may differ from a design flow 1200 for designing a standard component or from a design flow 1200 for instantiating the design into a programmable array, for example a programmable gate array (PGA) or a field programmable gate array (FPGA) offered by Altera® Inc. or Xilinx® Inc.

FIG. 12 illustrates multiple such design structures including an input design structure 1220 that is preferably processed by a design process 1210. Design structure 1220 may be a logical simulation design structure generated and processed by design process 1210 to produce a logically equivalent functional representation of a hardware device. Design structure 1220 may also or alternatively comprise data and/or program instructions that when processed by design process 1210, generate a functional representation of the physical structure of a hardware device. Whether representing functional and/or structural design features, design structure 1220 may be generated using electronic computer-aided design (ECAD) such as implemented by a core developer/designer. When encoded on a machine-readable data transmission, gate array, or storage medium, design structure 1220 may be accessed and processed by one or more hardware and/or software modules within design process 1210 to simulate or otherwise functionally represent an electronic component, circuit, electronic or logic module, apparatus, device, or system, which can be implemented with the method and system of the present invention. As such, design structure 1220 may comprise files or other data structures including human and/or machine-readable source code, compiled structures, and computer-executable code structures that when processed by a design or simulation data processing system functionally simulate or otherwise represent circuits or other levels of hardware logic design. Such data structures may include hardware-description language (HDL) design entities or other data structures conforming to and/or compatible with lower-level HDL design languages such as Verilog and VHDL, and/or higher level design languages such as C or C++.

Design process 1210 preferably employs and incorporates hardware and/or software modules for synthesizing, translating, or otherwise processing a design/simulation functional equivalent of the components, circuits, devices, or logic structures to generate a netlist 1280, which may contain design structures such as design structure 1220. Netlist 1280 may comprise, for example, compiled or otherwise processed data structures representing a list of wires, discrete components, logic gates, control circuits, I/O devices, models, etc. that describes the connections to other elements and circuits in an integrated circuit design. Netlist 1280 may be synthesized using an iterative process in which netlist 1280 is re-synthesized one or more times depending on design specifications and parameters for the device. As with other design structure types described herein, netlist 1280 may be recorded on a machine-readable data storage medium or programmed into a programmable gate array. The medium may be a non-volatile storage medium such as a magnetic or optical disk drive, a programmable gate array, a compact flash, or other flash memory. Additionally, or in the alternative, the medium may be a system or cache memory, buffer space, or electrically or optically conductive devices and materials on which data packets may be transmitted and intermediately stored via the Internet, or other networking suitable means.

Design process 1210 may include hardware and software modules for processing a variety of input data structure types including netlist 1280. Such data structure types may reside, for example, within library elements 1230 and include a set of commonly used elements, circuits, and devices, including models, layouts, and symbolic representations, for a given manufacturing technology (e.g., different technology nodes, 32 nm, 45 nm, 90 nm, etc.). The data structure types may further include design specifications 1240, characterization data 1250, verification data 1260, design rules 1270, and test data files 1285 that may include input test patterns, output test results, and other testing information. Design process 1210 may further include, for example, standard mechanical design processes such as stress analysis, thermal analysis, mechanical event simulation, process simulation for operations such as casting, molding, and die press forming, etc. One of ordinary skill in the art of mechanical design can appreciate the extent of possible mechanical design tools and applications used in design process 1210 without deviating from the scope and spirit of the invention. Design process 1210 may also include modules for performing standard circuit design processes such as timing analysis, verification, design rule checking, place and route operations, etc.

Design process 1210 employs and incorporates logic and physical design tools such as HDL compilers and simulation model build tools to process design structure 1220 together with some or all of the depicted supporting data structures along with any additional mechanical design or data (if applicable), to generate a second design structure 1290.

Design structure 1290 resides on a storage medium or programmable gate array in a data format used for the exchange of data of mechanical devices and structures (e.g. information stored in an IGES, DXF, Parasolid XT, JT, DRG, or any other suitable format for storing or rendering such mechanical design structures). Similar to design structure 1220, design structure 1290 preferably comprises one or more files, data structures, or other computer-encoded data or instructions that reside on transmission or data storage media and that when processed by an ECAD system generate a logically or otherwise functionally equivalent form of one or more devices. In one embodiment, design structure 1290 may comprise a compiled, executable HDL simulation model that functionally simulates the devices.

Design structure 1290 may also employ a data format used for the exchange of layout data of integrated circuits and/or symbolic data format (e.g. information stored in a GDSII (GDS2), GL1, OASIS, map files, or any other suitable format for storing such design data structures). Design structure 1290 may comprise information such as, for example, symbolic data, map files, test data files, design content files, manufacturing data, layout parameters, wires, levels of metal, vias, shapes, data for routing through the manufacturing line, and any other data required by a manufacturer or other designer/developer to produce a device or structure. Design structure 1290 may then proceed to a stage 1295 where, for example, design structure 1290: proceeds to tape-out, is released to manufacturing, is released to a mask house, is sent to another design house, is sent back to the customer, etc.

The methods as described above are used in the fabrication of integrated circuit chips. The resulting integrated circuit chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case, the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In embodiments, a service provider, such as a Solution Integrator, could offer to perform the processes described herein. In this case, the service provider can create, maintain, deploy, and support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

What is claimed is:

1. A method implemented in a computer infrastructure having computer executable code tangibly embodied on a computer readable storage medium having programming instructions operable to:
   separate random variation in a logarithm of a leakage current into a correlated random component and an uncorrelated random component;
   determine a first standard deviation of the correlated random component for an ensemble device;
   determine a second standard deviation of the uncorrelated random component for the ensemble device;
   generate a statistical model for electrical features of the ensemble device, based on a number m of individual devices within the ensemble device, a sub-threshold slope, an uplift factor, the first standard deviation, the second standard deviation, and statistical random variables; and
   during semiconductor manufacturing, fabricating integrated chips with minimal leakage and improved power optimization based on the generated statistical model for electrical features of the ensemble device.

2. The method of claim 1, wherein the electrical features are at least one of leakage current and threshold voltage, and the method further comprises determining an uncorrelated component of random variation and a correlated component of random variation for the ensemble device.

3. The method of claim 2, wherein the uplift factor is determined by using the second standard deviation of the uncorrelated random component, the number m of individual devices, and the uncorrelated component of the random variation associated with the sub-threshold slope.

4. The method of claim 2, wherein the uplift factor is determined by using the first standard deviation of the correlated random component, the number m of individual devices, and the correlated component of random variation associated with the sub-threshold slope.

5. The method of claim 1, further comprises determining a shift in average of a single-point threshold voltage of the ensemble device.

6. The method of claim 5, wherein the shift in average of the single-point threshold voltage of the ensemble device is determined by the number m of individual devices, the second standard deviation of the uncorrelated random component for the ensemble device, the uplift factor, and the sub-threshold slope.

7. The method of claim 1, wherein the number m of individual devices are connected in parallel within the ensemble device.

8. The method of claim 1, wherein the ensemble device is a planar field effect transistor (FET) and the number m of individual devices are associated with a total finger number.

9. The method of claim 1, wherein the value associated with the number m of individual devices is a product of a multiplicity value and a finger number per multiplicity.

10. The method of claim 1, wherein the ensemble device is a fin-field effect transistor (finFET) and the number m of individual devices are associated with a total fin number in the ensemble device.

11. The method of claim 10, wherein when every multiplicity has a same finger number and every finger has a same fin number, the number m of individual devices is the product of a multiplicity value, finger number per multiplicity, and a fin number per finger.

12. The method of claim 1, wherein the first standard deviation decreases with an increasing value of number m of individual devices and is not inversely proportional to a square root of the number m of individual devices.

13. The method of claim 1, wherein the number m of individual devices comprises a number of fingers in a MOS varactor.

* * * * *